(12) United States Patent
Ishimitsu et al.

(10) Patent No.: US 10,190,554 B2
(45) Date of Patent: Jan. 29, 2019

(54) FUEL SUPPLY DEVICE

(71) Applicant: HONDA MOTOR CO., LTD., Tokyo (JP)

(72) Inventors: Kengo Ishimitsu, Wako (JP); Yusuke Oda, Wako (JP); Hiroshi Chishima, Wako (JP); Hirotsugu Kudo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 228 days.

(21) Appl. No.: 15/126,134

(22) PCT Filed: Dec. 12, 2014

(86) PCT No.: PCT/JP2014/006192
§ 371 (c)(1),
(2) Date: Sep. 14, 2016

(87) PCT Pub. No.: WO2015/155813
PCT Pub. Date: Oct. 15, 2015

(65) Prior Publication Data
US 2017/0122275 A1    May 4, 2017

(30) Foreign Application Priority Data

Apr. 7, 2014    (JP) .................................. 2014-078669
Sep. 16, 2014   (JP) .................................. 2014-187574
Sep. 16, 2014   (JP) .................................. 2014-187577

(51) Int. Cl.
*F02M 37/22*     (2006.01)
*B60K 15/03*     (2006.01)
(Continued)

(52) U.S. Cl.
CPC ......... *F02M 37/223* (2013.01); *B01D 61/362* (2013.01); *B01D 61/366* (2013.01);
(Continued)

(58) Field of Classification Search
None
See application file for complete search history.

(56) References Cited

U.S. PATENT DOCUMENTS 2,930,754 A * 3/1960 Stuckey ............... B01D 61/364
                                                    208/308
2,958,656 A * 11/1960 Stuckey ............... B01D 61/364
                                                    203/91
(Continued)

FOREIGN PATENT DOCUMENTS

JP    S50011108 U    5/1948
JP    S49004486 Y2   2/1974
(Continued)

OTHER PUBLICATIONS

Office Action of Japanese Patent Application No. 2014-187577, dated Mar. 21, 2017, 3 pages.
(Continued)

*Primary Examiner* — Robert J Popovics
(74) *Attorney, Agent, or Firm* — Armstrong Teasdale LLP

(57) ABSTRACT

In a fuel supply device for separating raw fuel into high-octane fuel and low-octane fuel and supplying the fuel, to arrange the structural components compactly and to facilitate sealing against fuel vapor, the fuel supply device (1) includes: a raw fuel tank (2) for storing raw fuel; a separator (6) provided inside the raw fuel tank to separate the raw fuel into high-octane fuel that contains a greater amount of components with high octane numbers than the raw fuel and low-octane fuel that contains a greater amount of components with low octane numbers than the raw fuel; and a high-octane fuel tank (5) provided inside the raw fuel tank to store the high-octane fuel separated from the raw fuel by the separator.

11 Claims, 12 Drawing Sheets

(51) Int. Cl.
*B01D 61/36* (2006.01)
*F02D 19/06* (2006.01)
*F02M 37/00* (2006.01)
*F02M 31/18* (2006.01)

(52) U.S. Cl.
CPC ........ *B60K 15/03* (2013.01); *B60K 15/03177* (2013.01); *F02D 19/0649* (2013.01); *F02D 19/0671* (2013.01); *F02M 31/18* (2013.01); *F02M 37/0011* (2013.01); *F02M 37/0082* (2013.01); *F02M 37/0088* (2013.01); *B01D 2313/22* (2013.01); *B01D 2313/38* (2013.01); *B60K 2015/03098* (2013.01); *B60K 2015/03105* (2013.01); *B60K 2015/03157* (2013.01); *B60K 2015/03197* (2013.01); *B60K 2015/03243* (2013.01); *B60K 2015/03289* (2013.01); *B60K 2015/03296* (2013.01); *B60K 2015/03355* (2013.01); *Y02T 10/126* (2013.01); *Y02T 10/36* (2013.01)

(56) References Cited

U.S. PATENT DOCUMENTS

| | | | | |
|---|---|---|---|---|
| 2,958,657 | A * | 11/1960 | Binning | B01D 61/364 203/99 |
| 5,859,365 | A * | 1/1999 | Kataoka | G01F 22/02 73/149 |
| 5,979,417 | A * | 11/1999 | Hyodo | B60K 15/03 123/516 |
| 6,182,693 | B1 | 2/2001 | Stack et al. | |
| 6,260,544 | B1 * | 7/2001 | Spry | B60K 15/03504 123/516 |
| 6,389,893 | B1 * | 5/2002 | Kobayashi | B60K 15/077 73/290 B |
| 6,972,093 | B2 * | 12/2005 | Partridge | C10G 31/11 123/1 A |
| 7,013,844 | B2 * | 3/2006 | Oda | F02B 51/00 123/3 |
| 7,389,751 | B2 * | 6/2008 | Leone | F02D 19/0628 123/1 A |
| 7,720,592 | B2 * | 5/2010 | Leone | F02B 17/005 123/575 |
| 7,845,315 | B2 * | 12/2010 | Leone | F01N 3/005 123/1 A |
| 8,051,828 | B2 * | 11/2011 | Sengupta | F02D 41/0025 123/304 |
| 8,240,332 | B1 * | 8/2012 | Matusek | B01D 35/027 123/509 |
| 8,580,111 | B2 * | 11/2013 | Partridge | B01D 61/36 123/3 |
| 8,627,858 | B2 * | 1/2014 | Elwart | B60K 15/03 123/304 |
| 9,010,305 | B2 * | 4/2015 | Leone | F02D 19/0634 123/27 GE |
| 9,121,355 | B2 * | 9/2015 | Leone | F02D 19/0649 |
| 9,133,778 | B2 * | 9/2015 | Chishima | F02D 19/0602 |
| 9,211,792 | B2 * | 12/2015 | Balloul | F02D 19/0665 |
| 9,279,373 | B2 * | 3/2016 | Leone | F02D 41/1456 |
| 9,382,854 | B2 * | 7/2016 | Leone | F02D 19/0649 |
| 9,528,474 | B2 * | 12/2016 | Leone | F02D 41/0025 |
| 9,546,583 | B2 * | 1/2017 | Leone | F02D 19/0649 |
| 9,579,593 | B2 * | 2/2017 | Johnson | B01D 61/366 |
| 10,124,294 | B2 * | 11/2018 | Hamad | B01D 61/027 |
| 2005/0252489 | A1 * | 11/2005 | Moody | F02D 41/0025 123/435 |
| 2008/0006333 | A1 * | 1/2008 | Partridge | B60K 15/03 137/571 |
| 2008/0295809 | A1 | 12/2008 | Hochstein et al. | |
| 2009/0178654 | A1 * | 7/2009 | Leone | F02M 31/125 123/528 |
| 2009/0242038 | A1 * | 10/2009 | Sengupta | F02D 41/0025 137/93 |
| 2010/0224549 | A1 * | 9/2010 | Micke | B01D 29/356 210/321.65 |
| 2013/0168311 | A1 * | 7/2013 | Johnson | B01D 61/366 210/450 |
| 2013/0263825 | A1 * | 10/2013 | Chishima | F02D 19/0602 123/495 |
| 2014/0041642 | A1 * | 2/2014 | Tsutsumi | F02M 31/00 123/541 |
| 2015/0052876 | A1 * | 2/2015 | Leone | F02D 19/0649 60/273 |
| 2015/0052877 | A1 * | 2/2015 | Leone | F02D 19/0649 60/273 |
| 2015/0053189 | A1 * | 2/2015 | Leone | F02D 19/0634 123/575 |
| 2015/0308312 | A1 * | 10/2015 | Leone | F02D 19/0649 60/274 |
| 2017/0122275 | A1 * | 5/2017 | Ishimitsu | F02M 37/223 |

FOREIGN PATENT DOCUMENTS

| | | |
|---|---|---|
| JP | S60154234 U | 10/1985 |
| JP | S63175035 U | 11/1988 |
| JP | H02173350 A | 7/1990 |
| JP | 2003013819 A | 1/2003 |
| JP | 2004211583 A | 7/2004 |
| JP | 2008030642 A | 2/2008 |
| JP | 2008248736 A | 10/2008 |
| JP | 20080298077 A | 12/2008 |
| JP | 2009150397 A | 7/2009 |
| JP | 2011007135 A | 1/2011 |
| JP | 2011508147 A | 3/2011 |
| JP | 2011208541 A | 10/2011 |
| JP | 2013136944 A | 7/2013 |
| JP | 2014141921 A | 8/2014 |
| WO | 2014118830 A1 | 8/2014 |

OTHER PUBLICATIONS

Office Action of Japanese Patent Application No. 2014-187574, dated Apr. 4, 2017, 7 pages.
Office Action on Japanese Patent Application No. 2014-078669, dated Jun. 7, 2016, 5 pages.
International Search Report for International Application No. PCT/JP2014/006192, dated Mar. 10, 2015, 5 pages.

* cited by examiner

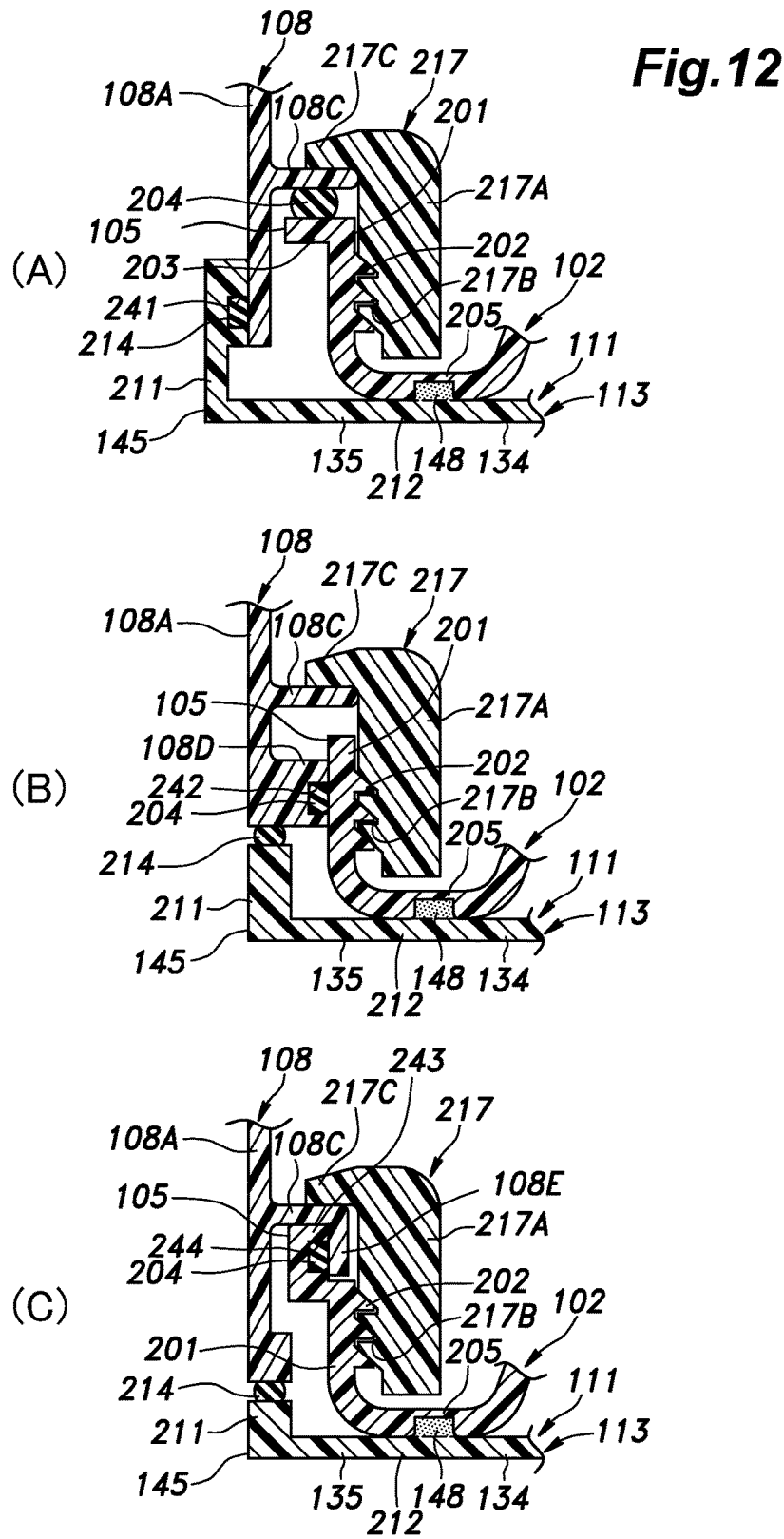

FUEL SUPPLY DEVICE

TECHNICAL FIELD

The present invention relates to a fuel supply device for an internal combustion engine.

BACKGROUND ART

There is known a fuel supply device that separates, with a separator, raw fuel that contains components with different octane numbers, such as ethanol-blended gasoline, into high-octane fuel that contains a greater amount of components with high octane numbers than the raw fuel and low-octane fuel that contains a greater amount of components with low octane numbers than the raw fuel, and supplies the high-octane fuel and the low-octane fuel selectively to an internal combustion engine (for example, Patent Document 1). The fuel supply device includes a raw fuel tank for storing the raw fuel, a heater for heating the raw fuel, a separator for separating the heated raw fuel into the high-octane fuel and the low-octane fuel by pervaporation using a separation membrane, a cooler for cooling each of the separated fuels, and a high-octane fuel tank for storing the high-octane fuel. This fuel supply device can suppress knocking by increasing the ratio of the high-octane fuel injected into the combustion chamber when the internal combustion engine operates at a high compression ratio.

PRIOR ART DOCUMENT (S)

Patent Document (s)

Patent Document 1: 2011-208541A

BRIEF SUMMARY OF THE INVENTION

Task to be Accomplished by the Invention

However, because the fuel supply device relating to Patent Document 1 includes the separator, heater, cooler, and high-octane fuel tank in addition to the raw fuel tank, it is difficult to arrange these devices efficiently in the vehicle body of an automobile. Further, there is a problem that the provision of the separator, heater, cooler, and fittings for connecting them may increase the area where a measure for preventing leakage of fuel vapor is required, and this makes the device more complicated and increases the cost.

In view of the foregoing background, an object of the present invention is to arrange the structural components compactly and to facilitate sealing against fuel vapor in a fuel supply device for separating raw fuel into high-octane fuel and low-octane fuel and supplying the fuel.

Means to Accomplish the Task

To achieve the above object, a fuel supply device (1) of the present invention comprises: a raw fuel tank (2) for storing raw fuel; a separator (6) provided inside the raw fuel tank to separate the raw fuel into high-octane fuel that contains a greater amount of components with high octane numbers than the raw fuel and low-octane fuel that contains a greater amount of components with low octane numbers than the raw fuel; and a high-octane fuel tank (5) provided inside the raw fuel tank to store the high-octane fuel separated from the raw fuel by the separator.

According to this configuration, because the separator and the high-octane fuel tank are disposed inside the raw fuel tank, there is no need to secure a space in the vehicle body of an automobile for arranging the separator and the high-octane fuel tank separately from the raw fuel tank. Therefore, it is possible to arrange the fuel supply device in the space for arranging a conventional fuel tank. Further, because the fuel supply device is configured as a single unit in that the separator, the high-octane fuel tank, and the raw fuel tank are combined integrally, assembly to the vehicle body is easy to carry out. Further, because the separator and the high-octane fuel tank are disposed inside the raw fuel tank, even if fuel vapor leaks from the separator, the high-octane fuel tank, and the fittings connecting them, the fuel vapor stays in the raw fuel tank and is prevented from leaking outside. Namely, by configuring the raw fuel tank air-tight, it is unnecessary to make the separator, the high-octane fuel tank, and the fittings connecting them be configured air-tight, and thus, the number of the members to be configured air-tight can be reduced.

In the above-mentioned invention, preferably, the separator has two chambers (6B, 6C) partitioned by a separation membrane (6A), such that the high-octane fuel in a gas state included in the raw fuel supplied to one (6B) of the chambers is caused to pass through the separation membrane by pervaporation to be collected in the other (6C) of the chambers, the fuel supply device further comprising a condenser (7) provided inside the raw fuel tank to condense the high-octane fuel in the gas state separated by the separator.

According to this configuration, because the condenser also is disposed inside the raw fuel tank, it is unnecessary to secure a space to dispose the condenser in the vehicle body. Further, there is no need to make the condenser and the fittings for the condenser be configured air-tight.

In the above-mentioned invention, preferably, the condenser is placed higher than the high-octane fuel tank.

According to this configuration, the high-octane fuel condensed by the condenser can be moved to the high-octane fuel tank by gravity.

In the above-mentioned invention, preferably, the fuel supply device further comprises a heater (17) provided inside the raw fuel tank to heat the raw fuel supplied from the raw fuel tank to the separator, wherein the condenser causes the raw fuel to exchange heat with the high-octane fuel before the raw fuel passes through the heater.

According to this configuration, the raw fuel stored in the raw fuel tank and having a relatively low temperature is used as a low-temperature heat medium for cooling in the condenser, whereby it is possible to secure a cooling source for the condenser in the raw fuel tank.

In the above-mentioned invention, preferably, the fuel supply device further comprises a heat exchanger (10) provided along an inner surface of a wall portion (2D) of the raw fuel tank to cause the low-octane fuel to exchange heat with the wall portion after the low-octane fuel has passed through the separator.

According to this configuration, the low-octane fuel having passed through the separator with a raised temperature is cooled by exchanging heat with the wall portion of the raw fuel tank which can dissipate heat to the outside.

In the above-mentioned invention, preferably, the wall portion where the heat exchanger is provided is a bottom wall portion (2D) of the raw fuel tank.

According to this configuration, because the bottom wall portion of the raw fuel tank is cooled more easily by the wind caused during travel of the vehicle than the other wall portions of the raw fuel tank, the effect of cooling of the low-octane fuel by the heat exchanger can be enhanced.

In the above-mentioned invention, preferably, an outer surface of the wall portion is provided with fins (41).

According to this configuration, the effect of cooling of the wall portion can be enhanced and the effect of cooling of the low-octane fuel by the heat exchanger can be enhanced.

In the above-mentioned invention, preferably, the raw fuel tank has a raw fuel tank opening (51) extending through an upper wall portion (2A) of the raw fuel tank and a lid (53) that openably closes the raw fuel tank opening; the high-octane fuel tank has a high-octane fuel tank opening (5D) extending through an upper wall portion (5A) of the high-octane fuel tank; and the high-octane fuel tank opening is located to align with the raw fuel tank opening and is openably closed by the lid.

According to this configuration, by opening the lid, the interior of the high-octane fuel tank can be opened.

In the above-mentioned invention, preferably, the fuel supply device further comprises a high-octane fuel supply pipe (65) extending from inside the high-octane fuel tank to outside through the lid to supply the high-octane fuel in the high-octane fuel tank to outside.

According to this configuration, because the high-octane fuel supply pipe extends through the lid, an air-tight structure may be concentratedly provided to the lid, and the area to have an air-tight structure can be reduced.

In the above-mentioned invention, preferably, the fuel supply device further comprises: a high-octane fuel pump (16) disposed inside the high-octane fuel tank to feed the high-octane fuel under pressure to outside via the high-octane fuel supply pipe; and a cable (66) including a signal line and a power supply line for the high-octane fuel pump and extending from inside the high-octane fuel tank to outside through the lid.

According to this configuration, because the cable extends through the lid, an air-tight structure may be concentratedly provided to the lid, and the area to have an air-tight structure can be reduced.

In the above-mentioned invention, preferably, the fuel supply device further comprises a high temperature medium transport pipe (47) that extends from outside to an interior of the high-octane fuel tank or an interior of the raw fuel tank through the lid to circulate a high temperature medium for heating the raw fuel supplied from the raw fuel tank to the separator.

According to this configuration, because the high temperature medium transport pipe extends through the lid, an air-tight structure may be concentratedly provided to the lid, and the area to have an air-tight structure can be reduced.

In the above-mentioned invention, preferably, the high-octane fuel tank has a communication passage (5B) that connects a gas phase portion in an upper part of the high-octane fuel tank and a gas phase portion in an upper part of the raw fuel tank.

According to this configuration, as the gas phase portion in the high-octane fuel tank and the gas phase portion in the raw fuel tank communicate each other through the communication passage, it is possible to suppress pressure fluctuation in the high-octane fuel tank without releasing the fuel vapor to the external environment. Further, there is no need to additionally provide a purge system for avoiding external release of fuel vapor discharged from the high-octane fuel tank.

Further, the fuel supply device (101) preferably includes: a first fuel tank (102); a skeleton member (111) provided inside the first fuel tank to suppress deformation of the first fuel tank; and a second fuel tank (113) provided inside the first fuel tank, wherein at least a part of the second fuel tank is formed by the skeleton member.

In the case where the high-octane fuel tank is disposed inside the raw fuel tank, there is a problem that the raw fuel tank tends to be larger because the number of components placed therein is increased. Further, it becomes a problem how to fix the high-octane fuel tank in the raw fuel tank stably. According to the above configuration, in a fuel supply device in which a second fuel tank is disposed inside a first fuel tank, it is possible to reduce the size of the first fuel tank and to fix the second fuel tank in the first fuel tank stably. Because the skeleton member disposed inside the first fuel tank forms a part of the second fuel tank, the volume of the components housed in the first fuel tank is reduced and the size of the first fuel tank can be reduced. Further, because the second fuel tank is formed to be integral with the skeleton member, the second fuel tank is secured to the first fuel tank via the skeleton member, which allows the second fuel tank to be fixed stably in the first fuel tank.

In the above-mentioned invention, preferably, the skeleton member includes a first member (111A) and a second member (111B) that is joined to the first member to define a space between the first member and the second member, and at least a part of the second fuel tank is formed by the first member and the second member.

According to this configuration, by joining to each other the first member and the second member which are parts of the skeleton member, the second fuel tank having an internal space can be formed, and thus, the second fuel tank can be formed easily.

In the above-mentioned invention, preferably, the second member is formed in a concave shape having a central portion recessed relative to a peripheral portion, and is joined to the first member at the peripheral portion.

According to this configuration, the volume of the second fuel tank can be increased owing to the second member formed in a concave shape.

In the above-mentioned invention, preferably, the first member has a recess (134) at a part facing the second member.

According to this configuration, the volume of the second fuel tank can be increased owing to the recess of the first member.

In the above-mentioned invention, preferably, engagement surfaces of the first member and the second member include portions facing upward and downward, and one of the first member and the second member contacts an inner surface of an upper wall of the first fuel tank while the other of the first member and the second member contacts an inner surface of a bottom wall of the first fuel tank.

According to this configuration, the first fuel tank is supported from inside by the first member and the second member of the skeleton member forming the second fuel tank, and deformation thereof is suppressed. On the other hand, the first member and the second member are sandwiched between the upper wall and the bottom wall of the first fuel tank, and thus, their positions are stable and separation of the engagement surfaces is suppressed.

In the above-mentioned invention, preferably, the first fuel tank, the first member, and the second member include resin material, and are welded to each other.

According to this configuration, the relative positions of the first fuel tank, the first member, and the second member can be maintained even more stably.

In the above-mentioned invention, preferably, the second member is made of metal.

According to this configuration, heat exchange between the second fuel tank and the first fuel tank is promoted via the second member, and local temperature elevation is suppressed.

In the above-mentioned invention, preferably, the first fuel tank includes a first opening edge (201, 203) that defines a first opening (105) communicating an inside and an outside of the first fuel tank with each other, and the second fuel tank includes a cylindrical portion (211) that is disposed to be substantially coaxial with the first opening and defines, on an inner side thereof, a second opening (145) communicating an inside and an outside of the second fuel tank with each other, wherein the fuel supply device further comprises: a lid member (108) including a first portion (108C) that opposes the first opening edge in an axial direction of the first opening, and a cylindrical second portion (108A) that extends along an inner circumferential surface or an outer circumferential surface of the cylindrical portion to oppose the cylindrical portion in a radial direction of the second opening; a first seal member (204) sandwiched between the first portion and the first opening edge; and a second seal member (214) sandwiched between the second portion and the cylindrical portion. Also preferably, the first fuel tank includes a cylindrical portion (201) that defines, on an inner side thereof, a first opening (105) communicating an inside and an outside of the first fuel tank with each other, and the second fuel tank includes a second opening edge (211) that is disposed to be substantially coaxial with the first opening and defines a second opening (145) communicating an inside and an outside of the second fuel tank with each other, wherein the fuel supply device further comprises: a lid member (108) including a cylindrical first portion (108D or 108E) that extends along an inner circumferential surface or an outer circumferential surface of the cylindrical portion to oppose the cylindrical portion in a radial direction of the first opening, and a second portion (108A) that opposes the second opening edge in an axial direction of the second opening; a first seal member (204) sandwiched between the first portion and the cylindrical portion; and a second seal member (214) sandwiched between the second portion and the second opening edge.

According to this configuration, the first opening and the second opening can be closed by a single common lid member. Further, because the compressing direction of the first seal member and the compressing direction of the second seal member are different from each other, even when an error is caused in the relative positions of the first opening and the second opening, the first seal member and the second seal member can reliably seal the gap between the lid member and the edge of the first opening and the gap between the lid member and the edge of the second opening.

In the above-mentioned invention, preferably, the first fuel tank stores raw fuel, and the second fuel tank stores high-octane fuel that contains a greater amount of components with high octane numbers than the raw fuel, wherein the high-octane fuel is separated from the raw fuel by a separator provided in the first fuel tank.

According to this configuration, the fuel supply device can supply the raw fuel and the high-octane fuel.

Further, preferably, the fuel supply device (101) comprises: a raw fuel tank (102) for storing raw fuel; a separation device (112) provided inside the raw fuel tank to separate the raw fuel into high-octane fuel that contains a greater amount of components with high octane numbers than the raw fuel and low-octane fuel that contains a greater amount of components with low octane numbers than the raw fuel; a high-octane fuel tank (113) provided inside the raw fuel tank to store the high-octane fuel separated from the raw fuel by the separation device; a tank support member (301) that is joined to the vehicle body to support a bottom wall (102B) of the raw fuel tank from below; and a separation device support member (114) that is disposed at a part of the bottom wall of the raw fuel tank overlapping the tank support member as seen in plan view to support the separation device.

As the separation device has a relatively large weight, when the separation device is disposed inside the raw fuel tank, there is a risk that a deformation may be caused to the raw fuel tank due to the load of the separation device. However, according to the above configuration, in a fuel supply device having a high-octane fuel tank and a separation device disposed inside a raw fuel tank, deformation of the raw fuel tank can be suppressed. Because the separation device support member that supports the relatively heavy separation device is disposed at a part of an upper surface of the bottom wall of the raw fuel tank overlapping the tank support member as seen in plan view, the load of the separation device and the separation device support member is supported by the tank support member, whereby deformation of the raw fuel tank is suppressed.

In the above-mentioned invention, preferably, a center of gravity of an assembly including the separation device support member and the separation device overlaps the tank support member as seen in plan view.

According to this configuration, the load of the separation device and the separation device support member is supported by the tank support member without fail, whereby deformation of the raw fuel tank is suppressed.

In the above-mentioned invention, preferably, the separation device comprises a plurality of units including a first unit (120) and a second unit (126), and the separation device support member includes: a base portion (114A) provided at a part of the bottom wall of the raw fuel tank overlapping the tank support member as seen in plan view; a first arm portion (114B) that extends from the base portion upwardly and laterally to support the first unit; and a second arm portion (114C) that extends from the base portion upwardly and laterally but opposite to the first arm portion to support the second unit.

According to this configuration, the first unit and the second unit, which are independent from each other, are supported by a common separation device support member, and the load of the first unit, the second unit, and the separation device support member is supported by the tank support member, whereby deformation of the raw fuel tank is suppressed.

In the above-mentioned invention, preferably, the bottom wall of the raw fuel tank is made of resin, the separation device support member is made of metal, a bottom of the base portion of the separation device support member is fitted with a coupling member (131) made of resin, and the coupling member is welded to the bottom wall of the raw fuel tank.

According to this configuration, the separation device support member made of metal can be secured on the bottom wall of the raw fuel tank.

In the above-mentioned invention, preferably, the first arm portion and the second arm portion extend in a direction substantially perpendicular to a direction of extension of the tank support member which extends in a predetermined direction, as seen in plan view.

According to this configuration, the separation device can be disposed above a part where the tank support member is not present, and thus, a degree of freedom of arranging the separation device is improved.

In the above-mentioned invention, preferably, the first unit includes a separator (117) that separates the raw fuel into the high-octane fuel and the low-octane fuel by pervaporation using a separation membrane, and the second unit includes a negative pressure pump (126) for supplying a negative pressure to the separator.

According to this configuration, the separator and the negative pressure pump which have a relatively large weight are supported by the tank support member via the separation device support member.

In the above-mentioned invention, preferably, the fuel supply device further includes a skeleton member provided inside the raw fuel tank to suppress deformation of the raw fuel tank, wherein the skeleton member is disposed around the separation device to regulate relative displacement of the separation device with respect to the raw fuel tank.

According to this configuration, even when an inertial force or a vehicle body oscillation due to travel of the vehicle is applied to the separation device and the separation device support member, displacement of the separation device relative to the raw fuel tank is suppressed.

In the above-mentioned invention, preferably, the tank support member preferably consists of a band extending in a fore-and-aft direction and having a front end and a rear end attached to a vehicle body.

According to this configuration, the tank support member can be embodied as a simple structure.

Effect of the Invention

According to the foregoing configuration, it is possible to arrange the structural components compactly and to facilitate sealing against the fuel vapor in a fuel supply device for separating raw fuel into high-octane fuel and low-octane fuel and supplying the fuel.

BRIEF DESCRIPTION OF THE DRAWINGS

FIGS. 12 (A) to (C) are transverse cross-sectional views showing modifications of the structure in the vicinity of the second opening and the third opening.

EMBODIMENTS FOR CARRYING OUT THE INVENTION

In the following, embodiments of a fuel supply device regarding the present invention will be described with reference to the drawings. The fuel supply device regarding the following embodiments is to be mounted on an automobile to supply fuel to an internal combustion engine also mounted on the automobile.

First Embodiment

Figure 1:
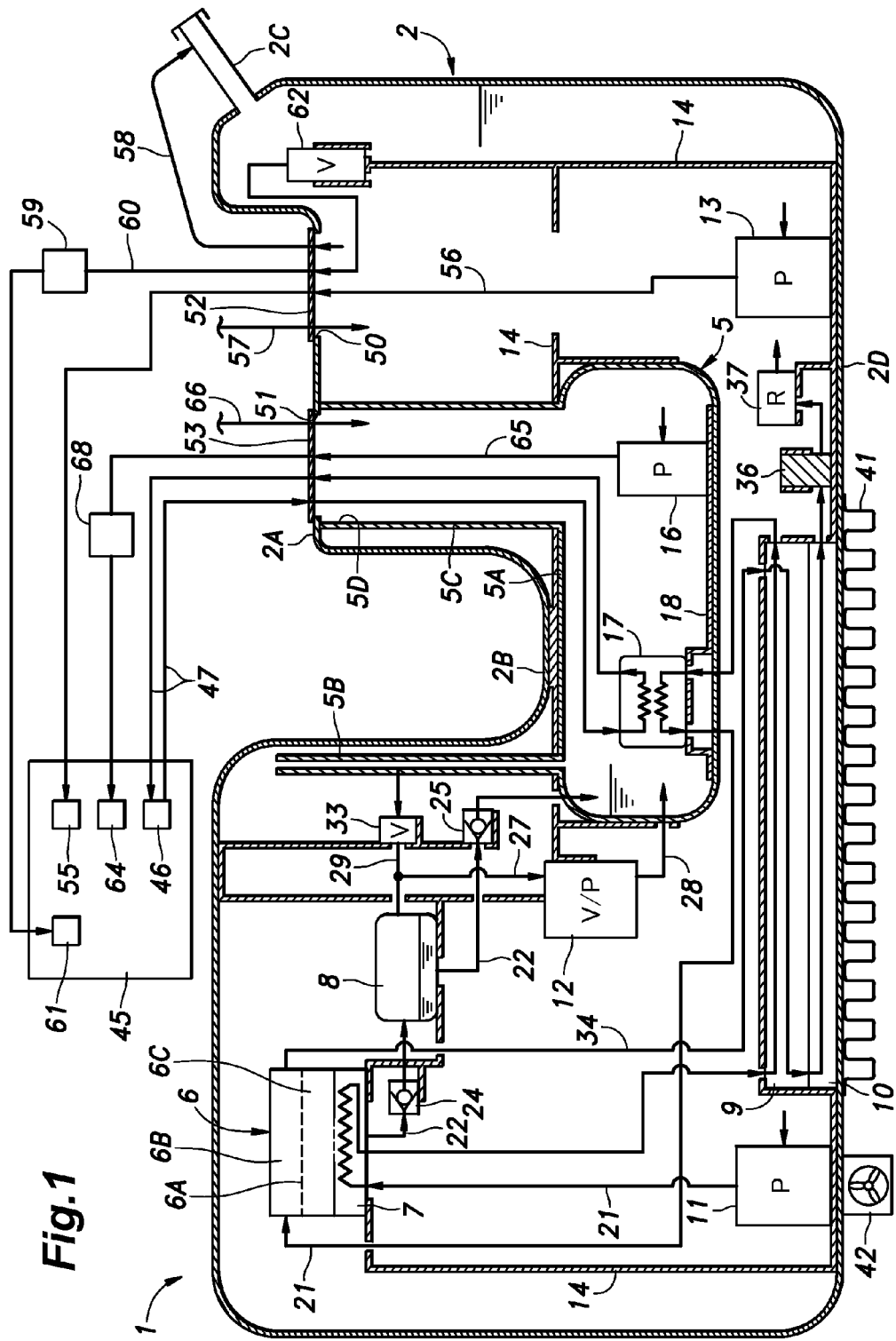
FIG. 1 is a schematic diagram of a fuel supply device regarding the first embodiment.

As shown in FIG. 1, a fuel supply device 1 includes a raw fuel tank 2 for storing raw fuel. The raw fuel contains components with different octane numbers, and consists of, for example, blended fuel having alcohol, such as ethanol, blended into gasoline (e.g., ethanol-blended gasoline).

The shape of the raw fuel tank 2 may be defined arbitrarily. In the first embodiment, the raw fuel tank 2 is formed to have a flat shape extending in a horizontal direction and has a recess 2B that is recessed downward at a widthwise central portion of an upper wall portion 2A thereof. In a state where the raw fuel tank 2 is mounted on the automobile, the recess 2B is positioned at a widthwise central portion, and component parts of the automobile, such as a propeller shaft, are disposed therein. The raw fuel tank 2 has a fill tube 2C in the upper wall portion 2A, such that the raw fuel can be supplied from outside via the fill tube 2C.

Inside the raw fuel tank 2 are provided a high-octane fuel tank 5, a separator 6, a condenser 7, a buffer tank 8, a first heat exchanger 9, a second heat exchanger 10, a fuel circulation pump 11, a vacuum pump 12, a raw fuel pump 13, and a first carrier 14 serving as a skeleton member supporting these elements. Inside the high-octane fuel tank 5 are provided a high-octane fuel pump 16, a third heat exchanger 17, and a second carrier 18 serving as a skeleton member supporting these elements.

The fuel circulation pump 11 is provided at a bottom of an interior of the raw fuel tank 2, and pressurizes the raw fuel stored in the raw fuel tank 2 to feed the fuel under pressure to the separator 6. On the path of a conduit 21 connecting the fuel circulation pump 11 and the separator 6, the condenser 7, the first heat exchanger 9, and the third heat exchanger 17 are arranged in order from the side of the fuel circulation pump 11. The raw fuel fed from the fuel circulation pump 11 under pressure undergoes heat exchange at the condenser 7, the first heat exchanger 9, and the third heat exchanger 17, such that the raw fuel having a temperature raised from that of the raw fuel stored at the bottom of the interior of the raw fuel tank 2 is supplied to the separator 6. Details of the condenser 7, the first heat exchanger 9, and the third heat exchanger 17 will be described later.

The separator 6 is a device that, based on pervaporation (PV), separates the raw fuel into high-octane fuel that contains a greater amount of components with high octane numbers than the raw fuel and low-octane fuel that contains a greater amount of components with low octane numbers than the raw fuel. The separator 6 includes a separation membrane 6A that selectively passes the high octane number components in the raw fuel, and a first chamber 6B and a second chamber 6C partitioned by the separation membrane 6A. The separation membrane 6A is, for example, a polymer membrane having no pores or an inorganic membrane having molecular-level microbores, and is appropriately selected in accordance with the components to be separated from the raw fuel. For instance, when the raw fuel is ethanol-blended gasoline, a membrane that selectively passes ethanol and aromatics should be selected as the separation membrane 6A.

The high-temperature and high-pressure raw fuel that has passed through the condenser 7, the first heat exchanger 9, and the third heat exchanger 17 owing to the fuel circulation pump 11 is supplied to the first chamber 6B of the separator 6. The pressure in the second chamber 6C is reduced by the vacuum pump 12, which will be described later. Thereby, the high octane number components in the raw fuel supplied to the first chamber 6B are vaporized and pass through the separation membrane 6A to be collected in the second chamber 6C. As a result, the fuel in the second chamber 6C makes high-octane fuel that contains a greater amount of components with high octane numbers than the raw fuel. On the other hand, as the raw fuel supplied to the first chamber 6B moves toward the exit of the first chamber 6B, a larger amount of components with high octane numbers is separated therefrom, whereby low-octane fuel that contains a greater amount of components with low octane numbers than the raw fuel is made. In a case where the raw fuel is ethanol-blended gasoline, the high-octane fuel collected in the second chamber 6C mainly contains ethanol, while the low-octane fuel passing through the first chamber 6B contains gasoline with a reduced amount (concentration) of ethanol.

The condenser 7 is preferably disposed adjacent to the second chamber 6C of the separator 6. In the first embodiment, the condenser 7 is joined to the separator 6 to form a single unit. At the condenser 7, the gaseous high-octane fuel supplied from the second chamber 6C and the raw fuel supplied from the fuel circulation pump 11 exchange heat while being prevented from mixing each other. As a result of this heat exchange, the gaseous high-octane fuel is cooled and condensed, and the raw fuel is heated.

The condenser 7 is connected to the high-octane fuel tank 5 by a conduit 22. The buffer tank 8 is provided on the path of the conduit 22. The condenser 7 is placed higher than the buffer tank 8 and the high-octane fuel tank 5, and the buffer tank 8 is placed higher than the high-octane fuel tank 5. Specifically, the positional relationship between the condenser 7, the buffer tank 8, and the high-octane fuel tank 5 is set such that the liquid surface in the condenser 7 is positioned higher than the liquid surface in the buffer tank 8 and the liquid surface in the high-octane fuel tank 5, and the liquid surface in the buffer tank 8 is positioned higher than the liquid surface in the high-octane fuel tank 5. Further, the separator 6 is preferably placed higher than the buffer tank 8 and the high-octane fuel tank 5. Due to the positional relationship between the condenser 7, the buffer tank 8, and the high-octane fuel tank 5, the high-octane fuel liquefied in the condenser 7 flows by gravity to the buffer tank 8, and further, from the buffer tank 8 to the high-octane fuel tank 5.

At a part of the conduit 22 connecting the condenser 7 and the buffer tank 8, a first one-way valve 24 that permits only the flow of fluid from the condenser 7 toward the buffer tank 8 is provided. Further, at a part of the conduit 22 connecting the buffer tank 8 and the high-octane fuel tank 5, a second one-way valve 25 that permits only the flow of fluid from the buffer tank 8 toward the high-octane fuel tank 5 is provided.

The inlet of the vacuum pump 12 is connected to a gas phase portion in an upper part of the buffer tank 8 via a conduit 27. The outlet of the vacuum pump 12 is connected to a lower part of the high-octane fuel tank 5 via a conduit 28. When the vacuum pump 12 is operated, the gas in the upper part of the buffer tank 8 is transported to the high-octane fuel tank 5 via the conduits 27, 28, and the pressure in the buffer tank 8 is reduced. Due to the reduction in pressure in the buffer tank 8, the flow of fluid from the condenser 7 toward the buffer tank 8 is enhanced, the first one-way valve 24 is opened, and the pressure in the condenser 7 and the second chamber 6C of the separator 6, which are in communication with the buffer tank 8, is reduced. At this time, in response to the reduction in pressure in the buffer tank 8, the second one-way valve 25 is closed, and thus, the pressure in the high-octane fuel tank 5 is not reduced.

The conduit 27 connecting the vacuum pump 12 and the buffer tank 8 has a branch pipe 29 that branches off therefrom. An end of the branch pipe 29 is in communication with a gas phase portion in the raw fuel tank 2. In the first embodiment, an upper wall portion 5A of the high-octane fuel tank 5 is provided with a communication pipe 5B that connects the gas phase portion in an upper part of the interior of the high-octane fuel tank 5 and the gas phase portion in an upper part of the raw fuel tank 2, and the branch pipe 29 is connected to the communication pipe 5B and is in communication with the gas phase portion in the raw fuel tank 2 via the communication pipe 5B. The communication pipe 5B has one end placed near an inner surface of the upper wall portion 2A of the raw fuel tank 2, and the other end placed near an inner surface of the upper wall portion 5A of the high-octane fuel tank 5.

An on-off valve 33 consisting of a solenoid valve is provided on the path of the branch pipe 29. The on-off valve 33 is closed when the pressure in the buffer tank 8 is to be reduced. When the on-off valve 33 is open, the gas in the raw fuel tank 2 flows into the buffer tank 8 via the communication pipe 5B, the branch pipe 29, and the conduit 27, and the pressure in the buffer tank 8 becomes equal to the pressure in the raw fuel tank 2. When the liquid high-octane fuel in the buffer tank 8 is to be transported to the high-octane fuel tank 5, the operation of the vacuum pump 12 is stopped and the on-off valve 33 is opened, so that the reduction in pressure in the buffer tank 8 is cancelled. As a result, the high-octane fuel flows by gravity from the buffer tank 8 toward the high-octane fuel tank 5, and the second one-way valve 25 is opened.

The outlet of the first chamber 6B of the separator 6 is in communication with a lower part of the space in the raw fuel tank 2 via a conduit 34. On the path of the conduit 34, the first heat exchanger 9, the second heat exchanger 10, a strainer 36, and a pressure regulating valve 37 are provided in order from the side of the separator 6.

The first heat exchanger 9 is a device for causing heat exchange between the raw fuel supplied from the fuel circulation pump 11 to the separator 6 and having a relatively low temperature and the low-octane fuel that has passed through the separator 6 and has a relatively high temperature, while preventing them from being mixed with each other. The first heat exchanger 9 may be a known counter-flow heat exchanger. As a result of the heat exchange at the first heat exchanger 9, the raw fuel supplied from the fuel circulation pump 11 to the separator 6 is heated, and the low-octane fuel having passed the separator 6 is cooled.

The second heat exchanger 10 has an internal space through which the low-octane fuel having passed through the separator 6 and having a relatively high temperature passes, and an outer surface in contact with an inner surface of a wall portion of the raw fuel tank 2, whereby heat is exchanged between the low-octane fuel and the wall portion of the raw fuel tank 2. In the first embodiment, the second heat exchanger 10 is formed to have a flat sheet-like shape and is disposed to be in contact with an inner surface of a bottom wall portion 2D of the raw fuel tank 2. To secure a large contact area with the bottom wall portion 2D, the second heat exchanger 10 extends over a large part of the inner surface of the bottom wall portion 2D.

An outer surface of the bottom wall portion 2D of the raw fuel tank 2 is provided with a plurality of fins 41. The fins 41 increase the outer surface area of the bottom wall portion 2D, and enhance the heat dissipation by air cooling of the bottom wall portion 2D. The fins 41 may be corrugated fins formed in pleats (wavelike shape), for example. Cooling of the bottom wall portion 2D of the raw fuel tank 2 is facilitated by the wind caused by traveling of the automobile on which the fuel supply device 1 is mounted.

The outer surface of the bottom wall portion 2D of the raw fuel tank 2 is provided with a fan 42. The fan 42 provides air toward the outer surface of the bottom wall portion 2D to forcibly cool the bottom wall portion 2D. In another embodiment, the fan 42 may be supported on a vehicle body skeleton forming the automobile or another device, instead of on the raw fuel tank 2.

In the first embodiment, the first heat exchanger 9 is formed to have a flat sheet-like shape, and is disposed on the upper surface of the second heat exchanger 10. The first heat exchanger 9 and the second heat exchanger 10 are joined to each other to form a single unit.

The low-octane fuel that has passed through the second heat exchanger 10 passes though the strainer 36 to remove foreign matter, then passes through the pressure regulating valve 37, and is discharged to the bottom of the interior of the raw fuel tank 2 to be mixed with the raw fuel. By the mixture of the low-octane fuel with the raw fuel, the octane number of the fuel in the raw fuel tank 2 is reduced. As the cycle of separation progresses (the total amount of the raw fuel passing through the separator 6 increases), the octane number of the fuel in the raw fuel tank 2 decreases and the components thereof approach those of the low-octane fuel. The pressure regulating valve 37 regulates the pressure of the raw fuel and the low-octane fuel in the path from the fuel circulation pump 11 to the pressure regulating valve 37, and maintains the pressure of the raw fuel in the first chamber 6B of the separator 6 at a predetermined pressure. Specifically, the pressure regulating valve 37 discharges the raw fuel (low-octane fuel) into the raw fuel tank 2 when the pressure of the raw fuel (low-octane fuel) raised by the fuel circulation pump 11 becomes the predetermined pressure or greater, to thereby maintain the pressure at the predetermined pressure.

The third heat exchanger 17 is a device for causing heat exchange between the raw fuel supplied from the fuel circulation pump 11 under pressure to the separator 6 and a high temperature heat medium supplied from outside of the raw fuel tank 2 while preventing them from being mixed with each other, and is used as a heater for heating the raw fuel. The third heat exchanger 17 may be a known counter-flow heat exchanger. The high temperature heat medium supplied to the third heat exchanger 17 may be, for example, cooling water whose temperature is raised as the cooling water passes through an internal combustion engine 45, lubricating oil whose temperature is raised as the lubricating oil passes through the internal combustion engine 45 and/or the transmission, automatic transmission fluid whose temperature is raised by heat exchange with the exhaust gas of the internal combustion engine 45, exhaust gas, etc. The high temperature heat medium in the first embodiment is the cooling water of the internal combustion engine 45, and a medium transport pipe 47 in communication with a cooling water passage 46 of the internal combustion engine 45 is connected with the third heat exchanger 17.

The raw fuel tank 2 includes a first opening 50 and a second opening 51 extending through a thickness of the upper wall portion 2A. The first opening 50 and the second opening 51 are openably closed air-tightly by a first lid 52 and a second lid 53, respectively.

The high-octane fuel tank 5 exhibits a flat shape extending in a horizontal direction, and is placed below the recess 2B and above the first heat exchanger 9 and the second heat exchanger 10. The upper wall portion 5A of the high-octane fuel tank 5 is provided with a cylindrical passage wall portion 5C that extends out upward to form a passage communicating with the first opening 50. An upper end opening 5D of the passage wall portion 5C is disposed to be aligned with the second opening 51. Thereby, when the second lid 53 is opened, the exterior of the raw fuel tank 2 and the interior of the high-octane fuel tank 5 are brought into communication. It is not necessary to provide an air-tight seal between the edge of the upper end opening 5D of the passage wall portion 5C and the edge of the first opening 50, and there may be a gap.

Passing through the first lid 52 are: a first fuel line 56 that connects the raw fuel pump 13 and a first injector 55 of the internal combustion engine 45; a first cable bundle 57 including a signal line and a power supply line for the raw fuel pump 13; a breather pipe 58 that connects the gas phase portion in the upper part of the raw fuel tank 2 and an upstream end portion of the fill tube 2C; and a vapor tube 60 that connects the gas phase portion in the upper part of the raw fuel tank 2 and a canister 59. The parts where the first fuel line 56, the first cable bundle 57, the breather pipe 58, and the vapor tube 60 pass through the first lid 52 are sealed air-tightly.

The breather pipe 58 releases the gas in the raw fuel tank 2 to the fill tube 2C when the raw fuel is supplied through the fill tube 2C to thereby facilitate the flow of the raw fuel into the raw fuel tank 2. The vapor tube 60 releases the fuel vapor in the raw fuel tank 2 to the canister 59 to maintain the pressure in the raw fuel tank 2 at atmospheric pressure. The fuel vapor sent to the canister 59 is absorbed by activated carbon in the canister 59. During operation of the internal combustion engine 45, the fuel absorbed by the canister 59 is drawn in an intake passage 61 by a negative pressure therein, and is burned in the combustion chamber. An end portion of the vapor tube 60 located inside the raw fuel tank is provided with a float valve 62. The float valve 62 is opened and closed in accordance with the liquid level of the raw fuel in the raw fuel tank 2 to prevent the liquid fuel from flowing in the vapor tube 60.

Passing through the second lid 53 are: a second fuel line 65 connecting the high-octane fuel pump 16 and a second injector 64 of the internal combustion engine 45; a second cable bundle 66 including a signal line and a power supply line for the high-octane fuel pump 16; and the medium transport pipe 47 for circulating the high temperature heat medium to the third heat exchanger 17. The parts where the second fuel line 65, the second cable bundle 66, and the medium transport pipe 47 pass through the second lid 53 are sealed air-tightly. The medium transport pipe 47 is connected with the cooling water passage 46 including a water jacket of the internal combustion engine 45, and water having a relatively high temperature flows therethrough.

The second injector 64 may be, for example, a port injection injector that injects fuel into the intake port, and the first injector 55 may be, for example, a direct injection injector that injects fuel into the combustion chamber. At a part of the second fuel supply line on a side of the second injector 64 than the second lid 53 is disposed a strainer 68 for catching foreign matter in the fuel.

The second cable bundle 66 may include a signal line for the on-off valve 33, a signal line and a power supply line for the fuel circulation pump 11, a signal line and a power supply line for the vacuum pump 12, and a signal line and a power supply line for the raw fuel pump 13. In this case, the second cable bundle 66 preferably extends from inside the high-octane fuel tank 5 through the communication pipe 5B to inside the raw fuel tank 2.

The fuel circulation pump 11, the separator 6, the first one-way valve 24, the buffer tank 8, the vacuum pump 12, the on-off valve 33, the second one-way valve 25, the high-octane fuel pump 16, the first heat exchanger 9, the second heat exchanger 10, the strainer 36, the pressure regulating valve 37, the raw fuel pump 13, and the float valve 62, which are disposed inside the raw fuel tank 2, are mounted on the first carrier 14 serving as a skeleton member to configure a first assembly. The relative position of the first carrier 14 with respect to the raw fuel tank 2 is determined by engagement of the first carrier 14 with an inner surface of the raw fuel tank 2. The relative position of each device configuring the first assembly with respect to the raw fuel tank 2 is determined by the mounting of the device to the first carrier 14.

The third heat exchanger 17 and the high-octane fuel pump 16, which are disposed inside the high-octane fuel tank 5, are mounted on the second carrier 18 serving as a skeleton member to configure a second assembly. The relative position of the second carrier 18 with respect to the high-octane fuel tank 5 is determined by engagement of the second carrier 18 with an inner surface of the high-octane fuel tank 5. The relative position of each device configuring the second assembly with respect to the high-octane fuel tank 5 is determined by the mounting of the device to the second carrier 18.

An example of a method for manufacturing the above-described fuel supply device 1 will be described hereinafter. First, the third heat exchanger 17 and the high-octane fuel pump 16 are mounted on the second carrier 18 to form the second assembly. At this time, the conduits and wirings associated with the devices configuring the second assembly are also connected as appropriate. Then, two parisons are placed to interpose the second assembly therebetween and are put in a die, and blow-molding is carried out to mold the high-octane fuel tank 5. Thereby, the high-octane fuel tank 5 having the second assembly provided therein is formed.

Next, devices including the high-octane fuel tank 5 are mounted on the first carrier 14 to form the first assembly. At this time, the conduits and wirings associated with the devices configuring the first assembly are also connected as appropriate. Then, two parisons are placed to interpose the first assembly therebetween and are put in a die, and blow-molding is carried out to mold the raw fuel tank 2. Thereby, the raw fuel tank 2 having the first assembly provided therein is formed.

Subsequently, the first fuel line 56, the first cable bundle 57, the breather pipe 58, and the vapor tube 60 are arranged to pass through the first lid 52, and an air-tight seal is provided to each of the parts where these components pass through the first lid 52. Further, the second fuel line 65, the second cable bundle 66, and the medium transport pipe 47 are arranged to pass through the second lid 53, and an air-tight seal is provided to each of the parts where these components pass through the second lid 53. Then, the first lid 52 is attached to the first opening 50, and the second lid 53 is attached to the second opening 51. Thereby, the fuel supply device 1 is configured.

In the above-described manufacturing method, the high-octane fuel pump 16 is attached to the second carrier 18 and the raw fuel pump 13 is attached to the first carrier 14 in advance, but the high-octane fuel pump 16 and the raw fuel pump 13 may be disposed in the high-octane fuel tank 5 and the raw fuel tank 2 through the first opening 50 and the second opening 51 after the raw fuel tank 2 is molded.

Further, in the above-described manufacturing method, the raw fuel tank 2 and the high-octane fuel tank 5 are made of resin, for example, but in another embodiment, the raw fuel tank 2 and the high-octane fuel tank 5 may be metal tanks. In this case, preferably, each tank 2, 5 is constituted of two or more parts, and the parts constituting each tank 2, 5 are bonded by means of welding or the like to form the tanks after the first assembly and the second assembly are disposed therein.

Description will now be made of the operations and effects of the fuel supply device 1 configured as above. In the fuel supply device 1, the raw fuel in the raw fuel tank 2 is pressurized by the fuel circulation pump 11, passes through the condenser 7, the first heat exchanger 9, and the third heat exchanger 17 in order, and is sent to the first chamber 6B of the separator. At this time, the raw fuel exchanges heat with the high-temperature, gaseous high-octane fuel at the condenser 7, with the high-temperature low-octane fuel that has passed through the separator 6 at the first heat exchanger 9, and with the high temperature heat medium at the third heat exchanger 17, whereby the temperature of the raw fuel is raised.

The pressure in the second chamber 6C of the separator 6 is reduced by an operation of the vacuum pump 12, with the on-off valve 33 closed. In the separator 6, when the pressure in the second chamber 6C is reduced by the suction action of the vacuum pump 12, high-octane fuel vaporizes from the high-temperature and high-pressure raw fuel supplied to the first chamber 6B, passes through the separation membrane 6A, and is collected in the second chamber 6C. The gaseous high-octane fuel collected in the second chamber 6C flows to the condenser 7, and at the condenser 7, exchanges heat with the raw fuel sent to the separator 6 by the fuel circulation pump 11 and thereby is cooled and condensed. The high-octane fuel condensed at the condenser 7 flows by gravity to the buffer tank 8 and is stored therein.

While the on-off valve 33 is closed and the vacuum pump 12 is operating, the second one-way valve 25 is closed, and therefore, the liquid high-octane fuel stored in the buffer tank 8 cannot flow to the high-octane fuel tank 5. At a predetermined timing, the on-off valve 33 is opened and the vacuum pump 12 is stopped, and this brings the interior of the buffer tank 8 and the interior of the raw fuel tank 2 into communication with each other, whereby the pressure in the buffer tank 8 becomes atmospheric pressure. When the pressure in the buffer tank 8 becomes atmospheric pressure, the high-octane fuel in the buffer tank 8 opens the second one-way valve 25 and flows into the high-octane fuel tank 5 by gravity. In this way, the high-octane fuel is stored in the high-octane fuel tank 5. In the case where the raw fuel is ethanol-blended gasoline, it can be said that the high-octane fuel tank 5 is an ethanol tank that mainly stores ethanol.

The low-octane fuel that has passed through the first chamber 6B of the separator 6 is cooled at the first heat exchanger 9 by exchanging heat with the raw fuel sent to the separator 6 by the fuel circulation pump 11, and is further cooled at the second heat exchanger 10 by exchanging heat with the bottom wall portion 2D of the raw fuel tank 2. Thereafter, the low-octane fuel passes through the strainer 36 and the pressure regulating valve 37, and is discharged into the raw fuel tank 2 to be mixed with the raw fuel in the raw fuel tank 2.

In the fuel supply device 1, as the total amount of the raw fuel passing through the separator 6 increases, the amount of the high-octane fuel stored in the high-octane fuel tank 5 increases and the ratio of the low-octane fuel contained in the raw fuel increases. The amount of the raw fuel passing through the separator 6 can be controlled by controlling the fuel circulation pump 11, the vacuum pump 12, and the on-off valve 33. It is preferred that the fuel circulation pump 11, the vacuum pump 12, and the on-off valve 33 be controlled based on the liquid level in the high-octane fuel tank 5, the concentration of the high-octane fuel in the raw fuel, the operating duration of the fuel circulation pump 11, etc.

In the fuel supply device 1 of the first embodiment, because the separator 6, the high-octane fuel tank 5, the first heat exchanger 9, the second heat exchanger 10, the third heat exchanger 17, the buffer tank 8, and the vacuum pump 12 are disposed inside the raw fuel tank 2, it is unnecessary to secure a space in the vehicle body of the automobile to dispose these devices separately from the raw fuel tank 2. Therefore, it is possible to dispose the fuel supply device 1 in the space in which a conventional fuel tank was disposed. Further, in the fuel supply device 1, devices including the separator 6 and the high-octane fuel tank 5 are integrally combined with the raw fuel tank 2 to form a single unit, and thus, assembly to the vehicle body is easy to carry out.

Further, since the devices such as the separator 6 and the high-octane fuel tank 5 are disposed inside the raw fuel tank 2, even if fuel vapor leaks from the devices including the separator 6 and the high-octane fuel tank 5 or from the fittings connecting these devices, the fuel vapor stays in the raw fuel tank 2 and is prevented from leaking outside. Namely, by configuring the raw fuel tank 2 air-tight, it is unnecessary to make the separator 6, the high-octane fuel tank 5, and the fittings connecting them be configured air-tight, and thus, the number of the members to be configured air-tight can be reduced.

At the condenser 7 and the first heat exchanger 9, the raw fuel present in the raw fuel tank 2 is used as a low-temperature heat medium for cooling. Therefore, it is possible to omit the structure for drawing the low-temperature heat medium into the raw fuel tank 2 from outside, to thereby simplify the fuel vapor seal structure. Further, from the point of view of the raw fuel, the raw fuel before being supplied to the separator 6 can be heated by using the gaseous high-octane fuel and the low-octane fuel having a high temperature present in the raw fuel tank 2 as a high temperature heat medium for heating.

At the second heat exchanger 10, the low-octane fuel cooled by the first heat exchanger 9 is further cooled by exchange of heat with the bottom wall portion 2D of the raw fuel tank 2. Because the bottom wall portion 2D of the raw fuel tank 2 receives wind during travel of the automobile and is cooled more easily than the other wall portions of the raw fuel tank 2, the effect of cooling of the low-octane fuel at the second heat exchanger 10 can be enhanced. In addition, the fins 41 provided on the outer surface of the bottom wall portion 2D and the fan 42 for forced cooling promote cooling of the bottom wall portion 2D, whereby the effect of cooling of the low-octane fuel is enhanced further.

In the fuel supply device 1 of the first embodiment, the first fuel line 56, the first cable bundle 57, the breather pipe 58, and the vapor tube 60, which extend inside and outside the raw fuel tank 2, concentratedly pass through first lid 52, and the second fuel line 65, the second cable bundle 66, and the medium transport pipe 47 concentratedly pass through the second lid 53, and therefore, it is possible to make the fuel vapor seal structure simple and reliable.

The first embodiment has been described in the foregoing, but the present invention is not limited to the first embodiment, and can be carried out with various modifications. For example, in the first embodiment, configuration was made such that the third heat exchanger 17 is disposed inside the high-octane fuel tank 5, but in another embodiment, the third heat exchanger 17 may be disposed outside the high-octane fuel tank 5 but inside the raw fuel tank 2. In this case, the medium transport pipe 47 may extend through the second lid 53 into the high-octane fuel tank 5 and then passes through the communication pipe 5B into the raw fuel tank 2. Alternatively, the medium transport pipe 47 may extend through the first lid 52 into the raw fuel tank 2.

Further, in the above-described embodiment, the second carrier 18 is provided inside the high-octane fuel tank 5 such that the second carrier 18 supports the third heat exchanger 17 and the high-octane fuel pump 16, but the second carrier 18 may be omitted. In this case, it is preferred that the third heat exchanger 17 and the high-octane fuel pump 16 be engaged with an inner surface of a wall portion of the high-octane fuel tank 5 such that their positions are secured.

Figure 2:
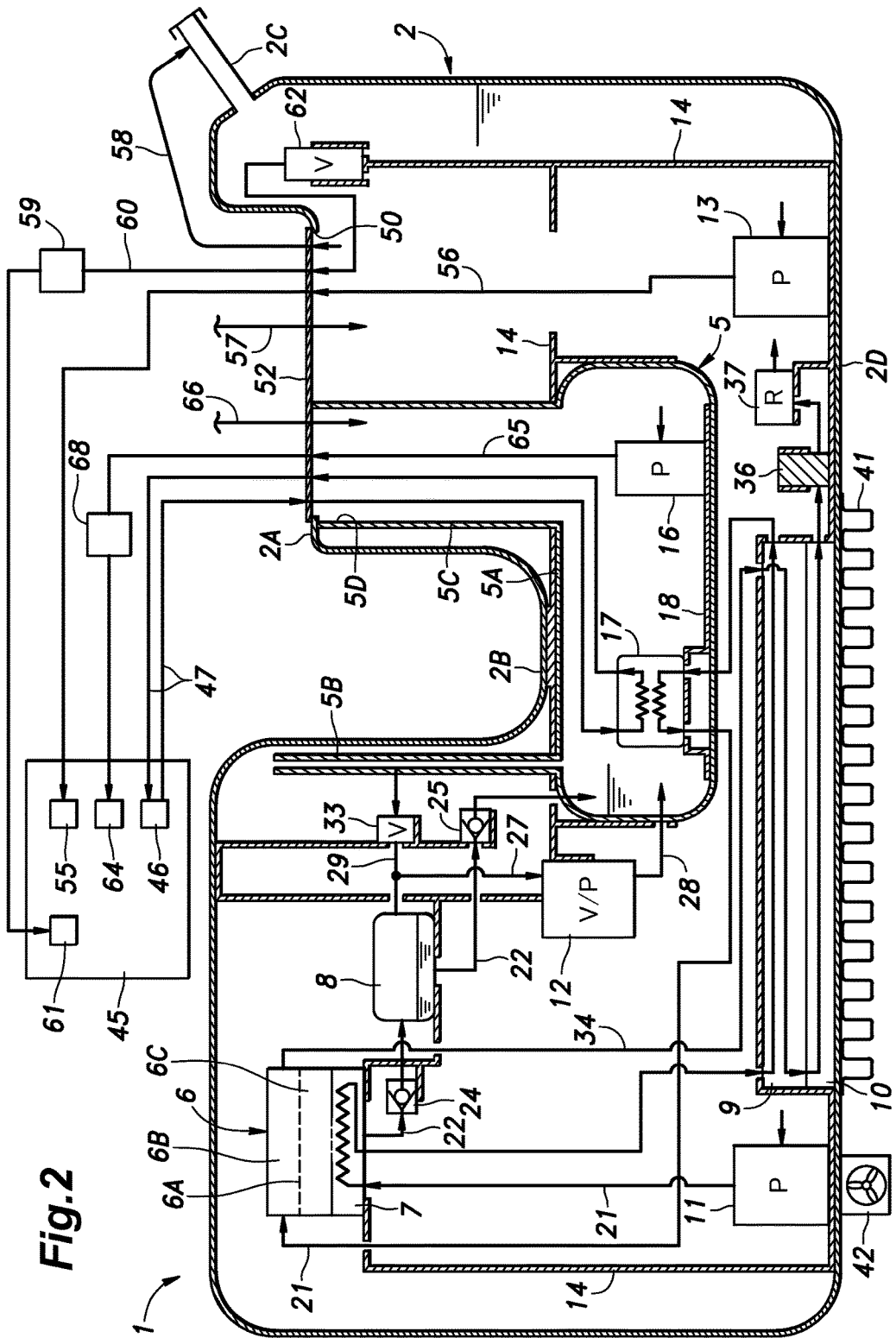
FIG. 2 is a cross-sectional view of a fuel supply device regarding a partial modification of the first embodiment.

In the above-described embodiment, the raw fuel tank 2 is provided with the first opening 50 and the second opening 51, which are closed by the first lid 52 and the second lid 53, respectively, but as shown in FIG. 2, the second opening 51 and the second lid 53 may be omitted and the single first opening 50 may be extended. In this case, arrangement is preferably made such that the upper end opening 5D of the passage wall portion 5C of the high-octane fuel tank 5 overlaps the first opening 50, whereby when the first lid 52 is opened, the exterior of the raw fuel tank 2 and the interior of the high-octane fuel tank 5 are brought into communication. Further, the second fuel line 65, the second cable bundle 66, and the medium transport pipe 47 are preferably arranged to pass through the first lid 52. Thereby, the parts that need a fuel vapor seal structure are concentrated to the first lid 52, and the fuel vapor seal structure is made even more simple and reliable.

Further, in the above-described embodiment, a separator that utilizes the separation membrane 6A and operates based on pervaporation is adopted as the separator 6, but in another embodiment, a variety of separators may be adopted. For example, a separator that uses a reforming catalyst to reform and separate alcohol from gasoline may be used as the separator.

Second Embodiment

A fuel supply device 101 regarding the second embodiment is to be mounted on an automobile to supply fuel to an internal combustion engine 184 also mounted on the automobile. In the following description, directions are defined based on the state where the fuel supply device 101 is mounted on the automobile.

Figure 3:
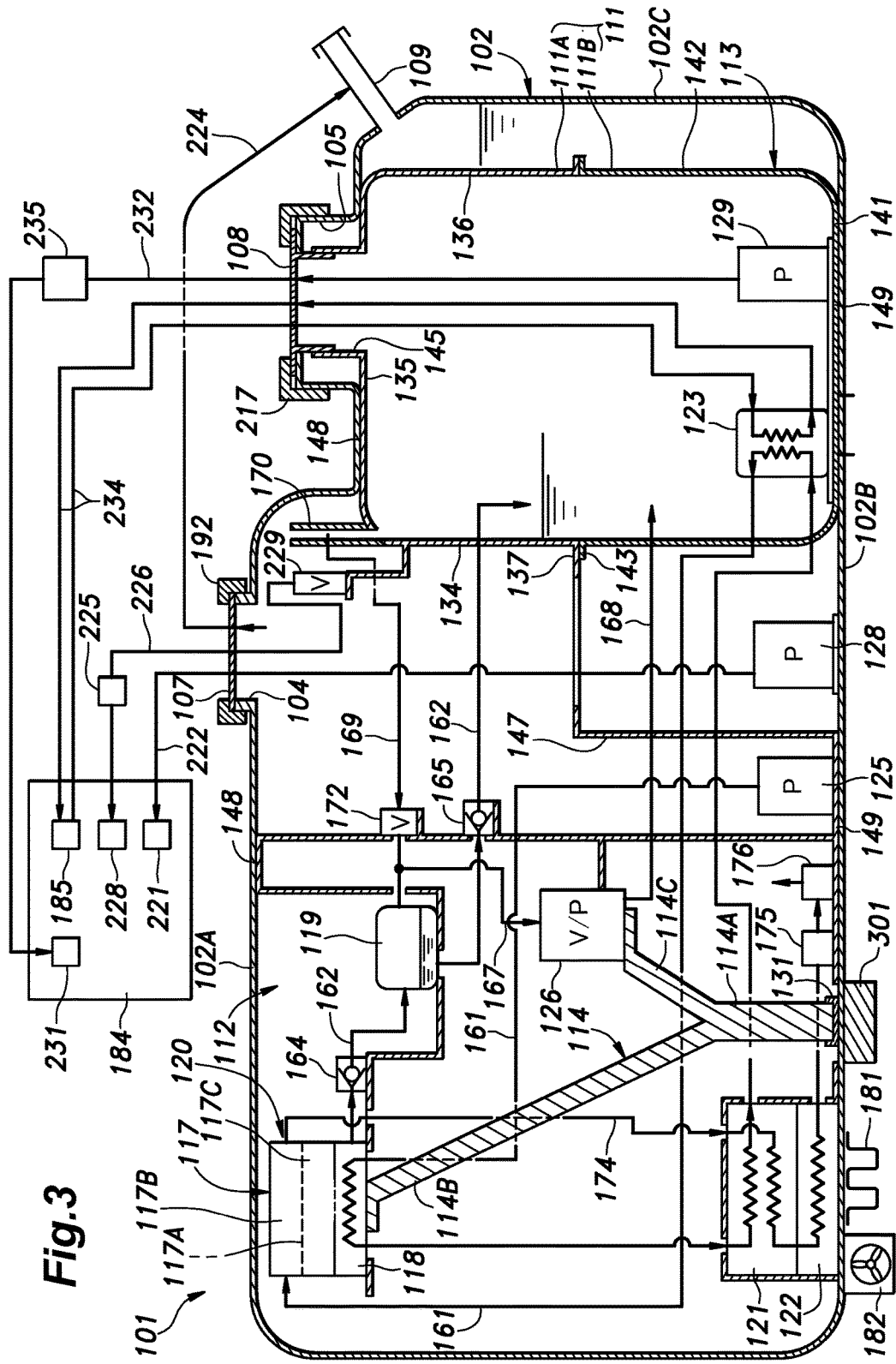
FIG. 3 is a schematic diagram of a fuel supply device regarding the second embodiment.
Figure 4:
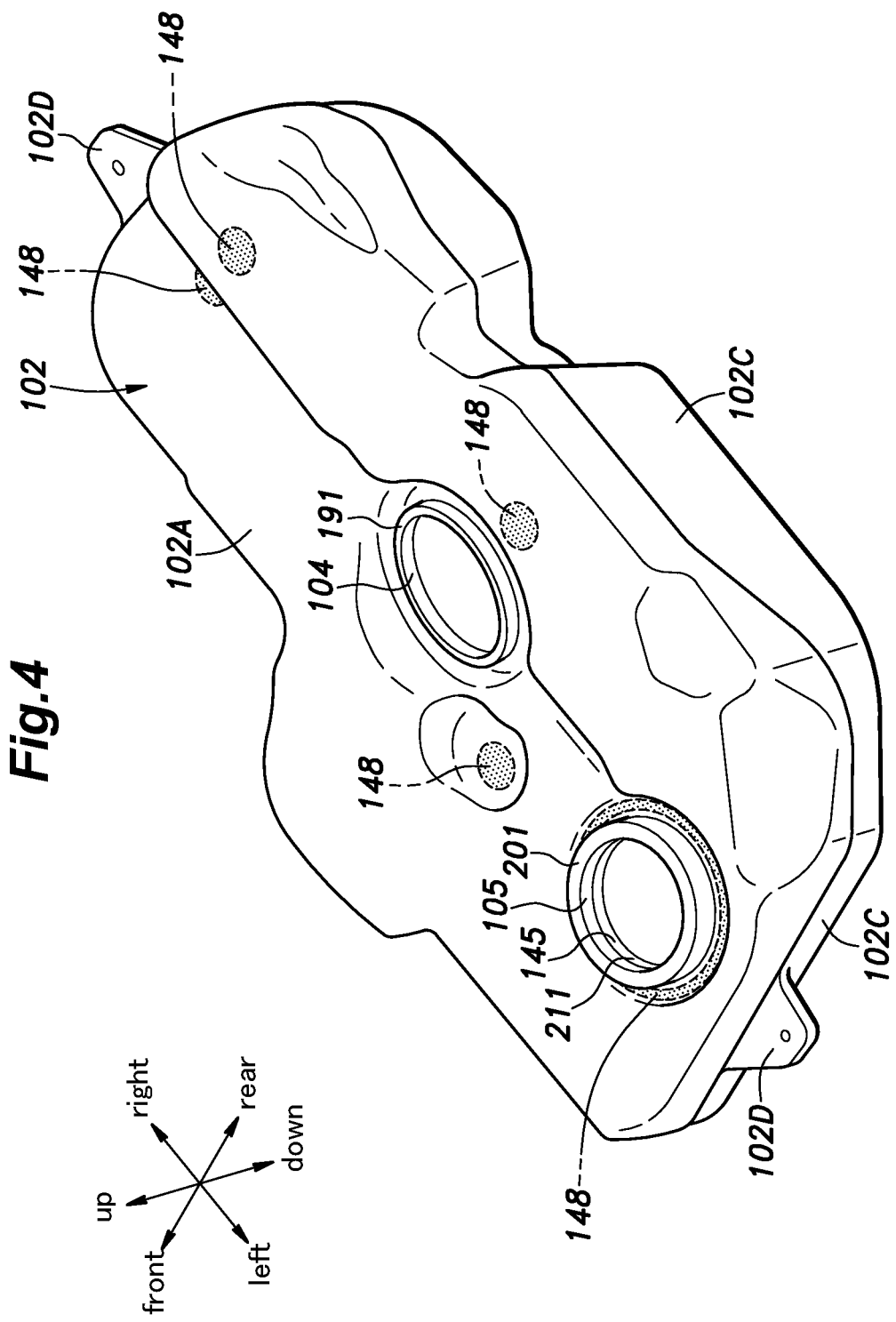
FIG. 4 is a perspective view showing a raw fuel tank regarding the second embodiment as seen from above.
Figure 5:
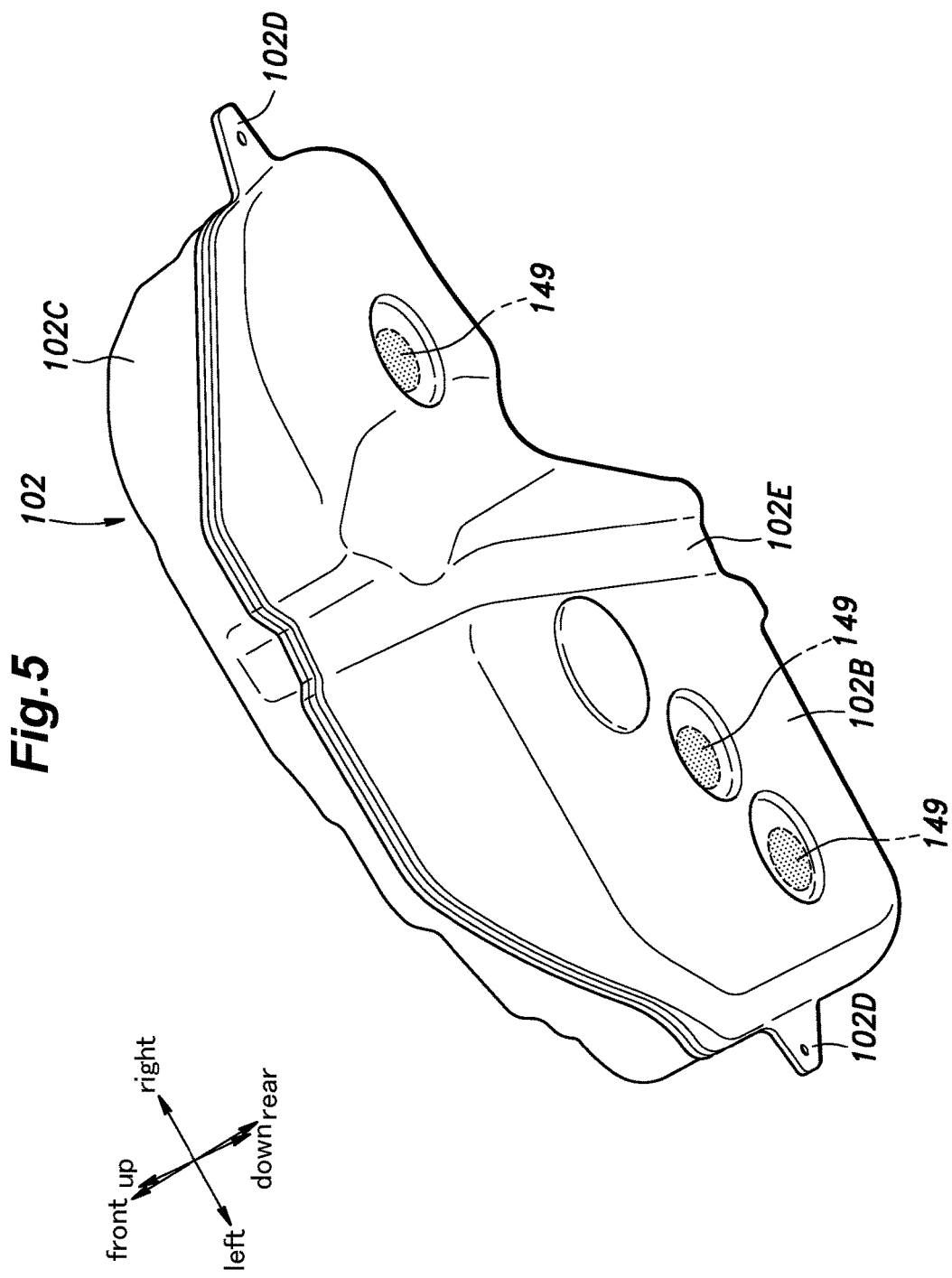
FIG. 5 is a perspective view showing the raw fuel tank regarding the second embodiment as seen from below.

As shown in FIG. 3, the fuel supply device 101 includes a raw fuel tank 102 (first fuel tank) for storing raw fuel. In the second embodiment, the raw fuel tank 102 is made of resin. The shape of the raw fuel tank 102 may be defined arbitrarily. As shown in FIGS. 3 to 5, the raw fuel tank 102 includes an upper wall 102A and a bottom wall 102B spaced apart from and opposing each other, and a side wall 102C provided along the periphery of the upper wall 102A and the bottom wall 102B, such that a space is defined therein. In the second embodiment, the raw fuel tank 102 is formed to have a relatively small height (height of the side wall 102C), and exhibits a flat shape. Further, the raw fuel tank 102 is formed such that when mounted on the automobile, the lateral length thereof is larger than the fore-and-aft length thereof.

Figure 6:
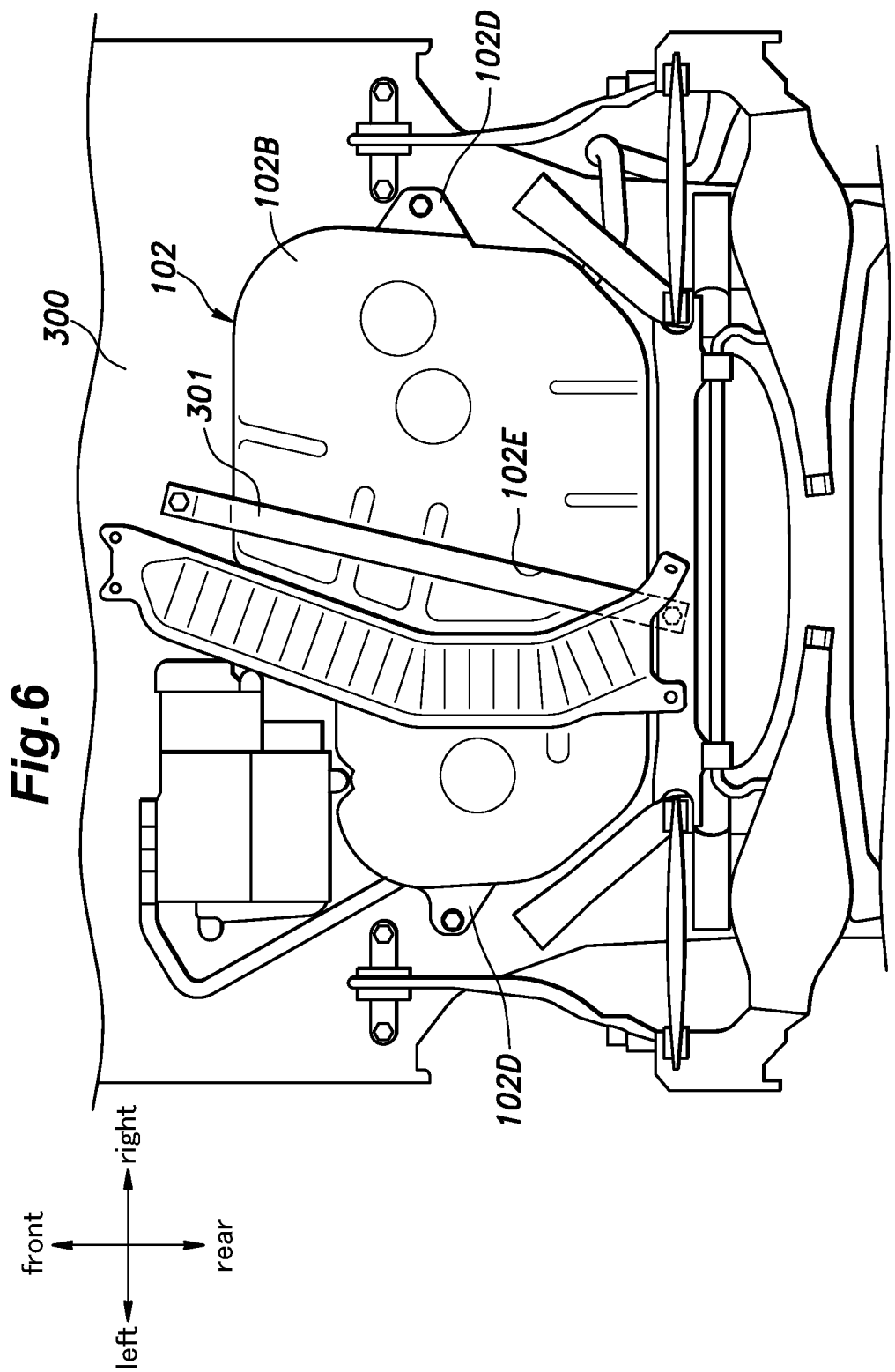
FIG. 6 is a bottom view showing the fuel supply device regarding the second embodiment mounted on an automobile.

As shown in FIG. 6, the raw fuel tank 102 is disposed beneath an underbody 300 constituting a bottom part of the vehicle body skeleton of the automobile. The underbody 300 includes a pair of rear frames extending in the fore-and-aft direction in the rear bottom part of the vehicle body, a plurality of cross members extending laterally between the rear frames, a plate-shaped rear floor supported by the rear frames and the cross members to form a floor of the vehicle cabin, etc.

As shown in FIGS. 4 to 6, the left and right outer surfaces of the side wall 102C of the raw fuel tank 102 are each provided with a plate-shaped engagement piece 102D that projects therefrom. Each engagement piece 102D is fastened to the underbody 300 by means of a bolt.

Further, the raw fuel tank 102 is also attached to the underbody 300 by means of a tank support member 301. In the second embodiment, the tank support member 301 consists of a belt-shaped member (tank band) made of metal, for example, and extends in the fore-and-aft direction along the undersurface (outer surface) of the bottom wall 102B of the raw fuel tank 102, with both ends (front and rear ends) thereof being attached to the underbody 300. Thereby, the raw fuel tank 102 is supported by the tank support member 301 from below the bottom wall 102B. The attachment of the tank support member 301 and the underbody 300 may be achieved as fastening by use of bolts or the like, welding, etc. At a substantially central part in the lateral direction of the undersurface the bottom wall 102B, a receiving groove 102E is formed to extend in the fore-and-aft direction. The tank support member 301 is fitted in the receiving groove 102E and extends along the receiving groove 102E. By the fitting of the tank support member 301 in the receiving groove 102E, relative displacement between the tank support member 301 and the raw fuel tank 102 is regulated.

As shown in FIGS. 3 to 5, the upper wall 102A is provided with a first opening 104 and a second opening 105 extending through a thickness of the upper wall 102A. The first opening 104 is openably closed by a first lid 107, and the second opening 105 is openably closed by a second lid 108. The upper wall 102A is provided with a fill tube 109 to allow the raw fuel to be supplied from outside.

As shown in FIG. 3, the fuel supply device 101 includes, inside the raw fuel tank 102, a carrier 111 serving as a skeleton member of the raw fuel tank 102, a separation device 112 (second fuel tank) for separating the raw fuel into high-octane fuel and low-octane fuel, a high-octane fuel tank 113 for storing the high-octane fuel separated by the separation device 112, and a sub-frame 114 (separation device support member) that supports a part of the separation device 112 relative to the raw fuel tank 102.

The separation device 112 includes, as main structural components thereof, a separator 117, a condenser 118, a buffer tank 119, first to third heat exchangers 121-123, a fuel circulation pump 125, and a vacuum pump 126 (negative pressure pump). The separator 117 and the condenser 118 are joined to each other to form a separator unit 120. Of the component parts of the separation device 112, the separator 117, the condenser 118, the buffer tank 119, the first and second heat exchangers 121, 122, the fuel circulation pump 125, and the vacuum pump 126 are disposed inside the raw fuel tank 102 and outside the high-octane fuel tank 113, while the third heat exchanger 123 is disposed inside the high-octane fuel tank 113.

In addition, the fuel supply device 101 includes a raw fuel pump 128 placed inside the raw fuel tank 102 and outside the high-octane fuel tank 113 to pump the fuel (raw fuel) stored inside the raw fuel tank 102 and outside the high-octane fuel tank 113 to the internal combustion engine 184, and a high-octane fuel pump 129 placed inside the high-octane fuel tank 113 to pump the high-octane fuel to the internal combustion engine 184.

Figure 8:
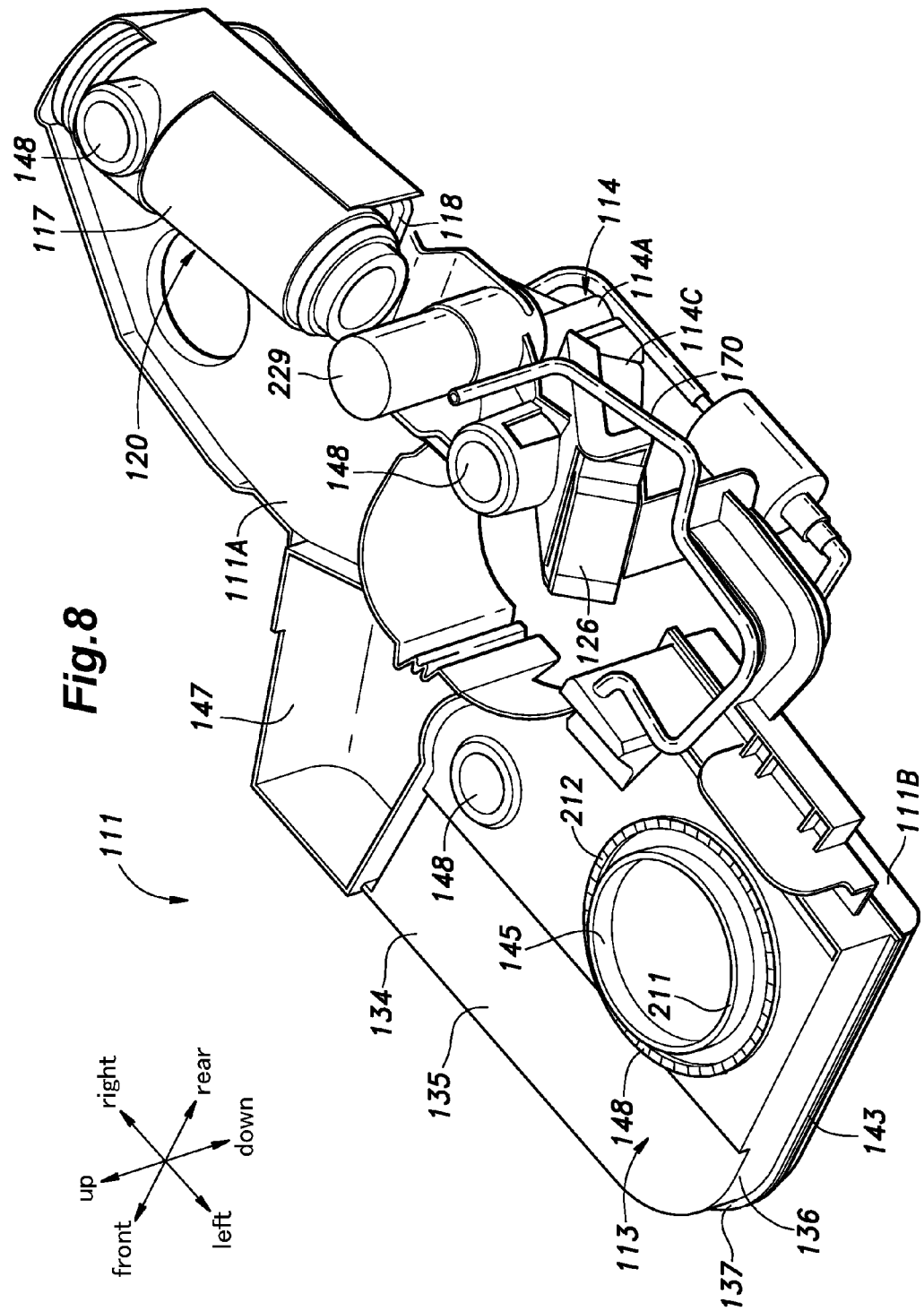
FIG. 8 is a perspective view showing a carrier, a sub-frame, a high-octane fuel tank, and a separation device regarding the second embodiment as seen from above through the raw fuel tank.
Figure 9:
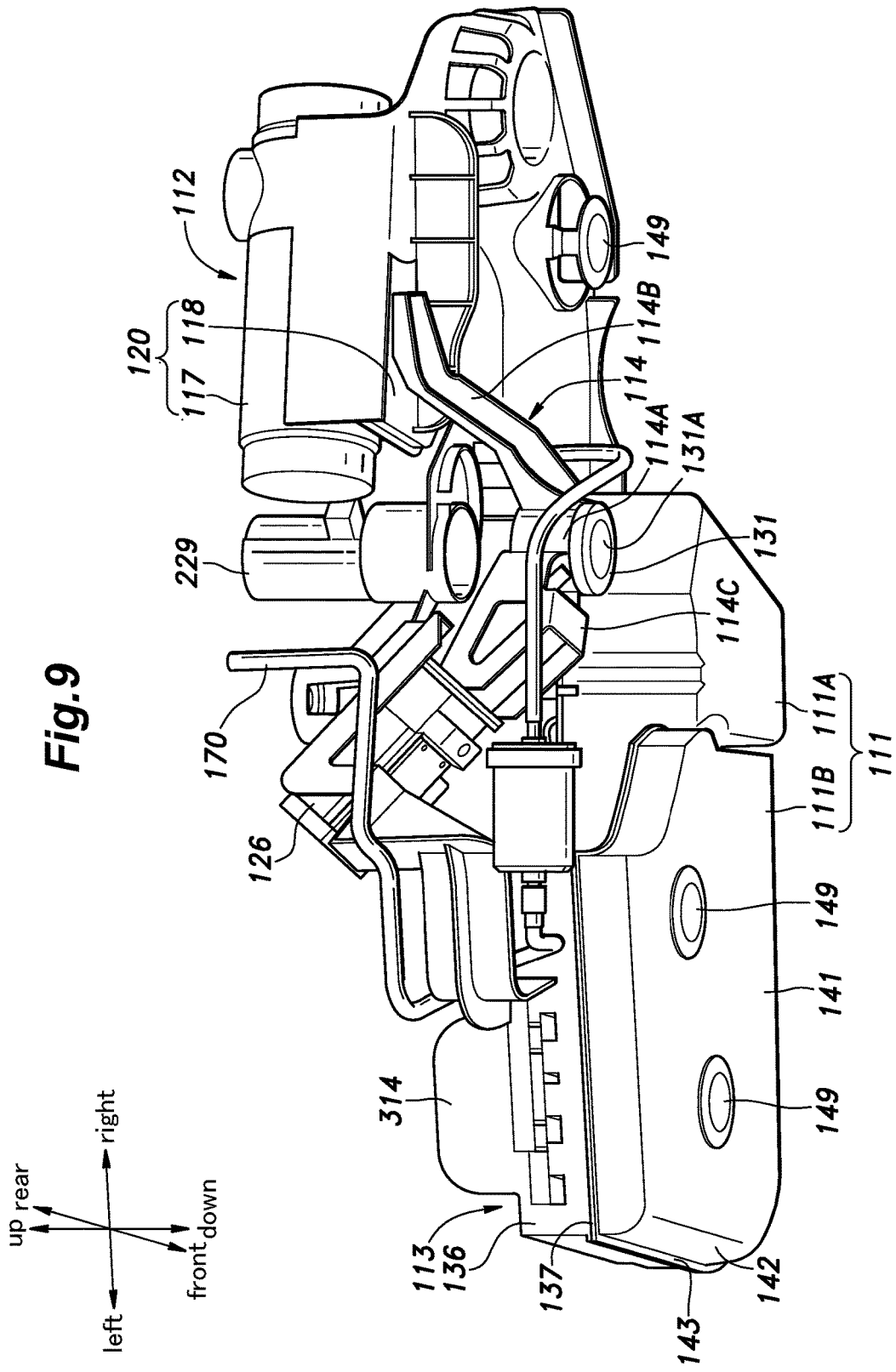
FIG. 9 is a perspective view showing the carrier, the sub-frame, the high-octane fuel tank, and the separation device regarding the second embodiment as seen from below through the raw fuel tank.
Figure 10:
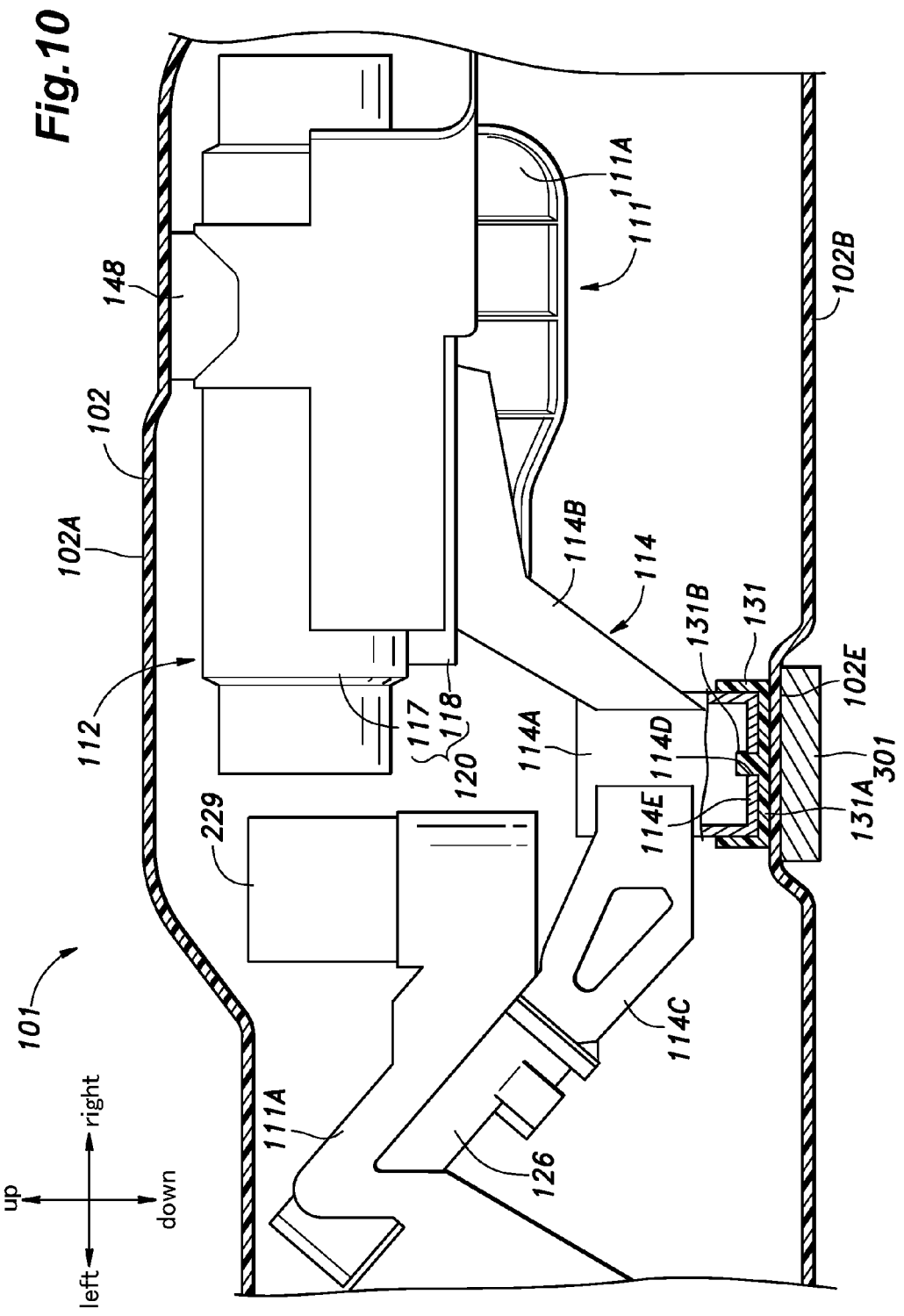
FIG. 10 is a transverse cross-sectional view showing the fuel supply device regarding the second embodiment as seen from rear.

As shown in FIGS. 8 to 10, the sub-frame 114 includes a base portion 114A forming a lower part, a first arm portion 114B extending from the base portion 114A upwardly and laterally, and a second arm portion 114C extending from the base portion 114A upwardly and laterally but opposite to the first arm portion 114B, whereby the sub-frame 114 is formed in a substantially Y-shape. The base portion 114A is formed in a cylindrical shape extending vertically, and the lower end thereof is provided with a bottom plate 114E that has at its center a fitting hole 114D consisting of a through-hole. The sub-frame 114 is made of metal.

The sub-frame 114 is joined to the inner surface (upper surface) of the bottom wall 102B of the raw fuel tank 102 via a coupling member 131 mounted on the lower end of the base portion 114A. The coupling member 131 is formed in a bottomed cylindrical shape (cup shape) having a bottom plate 131A at one end thereof, is mounted on the sub-frame 114 with the lower end of the base portion 114A fitted therein. At the center of the inner surface of the bottom plate 131A is formed a pillar portion 131B that is fitted into the fitting hole 114D. The pillar portion 131B swells with the raw fuel, and this strengthen the engagement with the fitting hole 114D.

The base portion 114A of the sub-frame 114 is disposed, via the coupling member 131, on a part of the upper surface of the bottom wall 102B of the raw fuel tank 102 that overlaps the tank support member 301 as seen in plan view. Specifically, the sub-frame 114 is disposed relative to the raw fuel tank 102 such that the center of the base portion 114A overlaps the coupling member 131 as seen in plan view. The outer surface (undersurface) of the coupling member 131 is welded to the upper surface of the bottom wall 102B.

The first arm portion 114B and the second arm portion 114C extend from the base portion 114A in a direction substantially perpendicular to the direction of extension of the tank support member 301 as seen in plan view; namely, in left and right directions such that they extend perpendicular to the tank support member 301, which extends in the fore-and-aft direction. The first arm portion 114B supports the separator unit 120 (the separator 117 and the condenser 118), while the second arm portion 114C supports the vacuum pump 126. The separator unit 120 and the vacuum pump 126 have a relatively large weight among the components of the separation device 112. The bonding between the first arm portion 114B and the separator unit 120 and between the second arm portion 114C and the vacuum pump 126 is achieved by fastening means such as screws, for example.

The lengths of the first arm portion 114B and the second arm portion 114C are adjusted such that, as seen in plan view, the center of gravity of the separator unit 120, the vacuum pump 126, and the sub-frame 114, which are joined to each other, is positioned to overlap the base portion 114A, more preferably, to overlap the center of the base portion 114A. In this way, the sub-frame 114 supporting the separator unit 120 and the vacuum pump 126 can free-stand on the bottom wall 102B, and the weight of the separator unit 120, the vacuum pump 126, and the sub-frame 114 is applied to the bottom wall 102B downwardly via the base portion 114A and the coupling member 131. The weight applied from the separator unit 120, the vacuum pump 126, and the sub-frame 114 to the bottom wall 102B is supported by the tank support member 301 placed directly below the base portion 114A.

Figure 7:
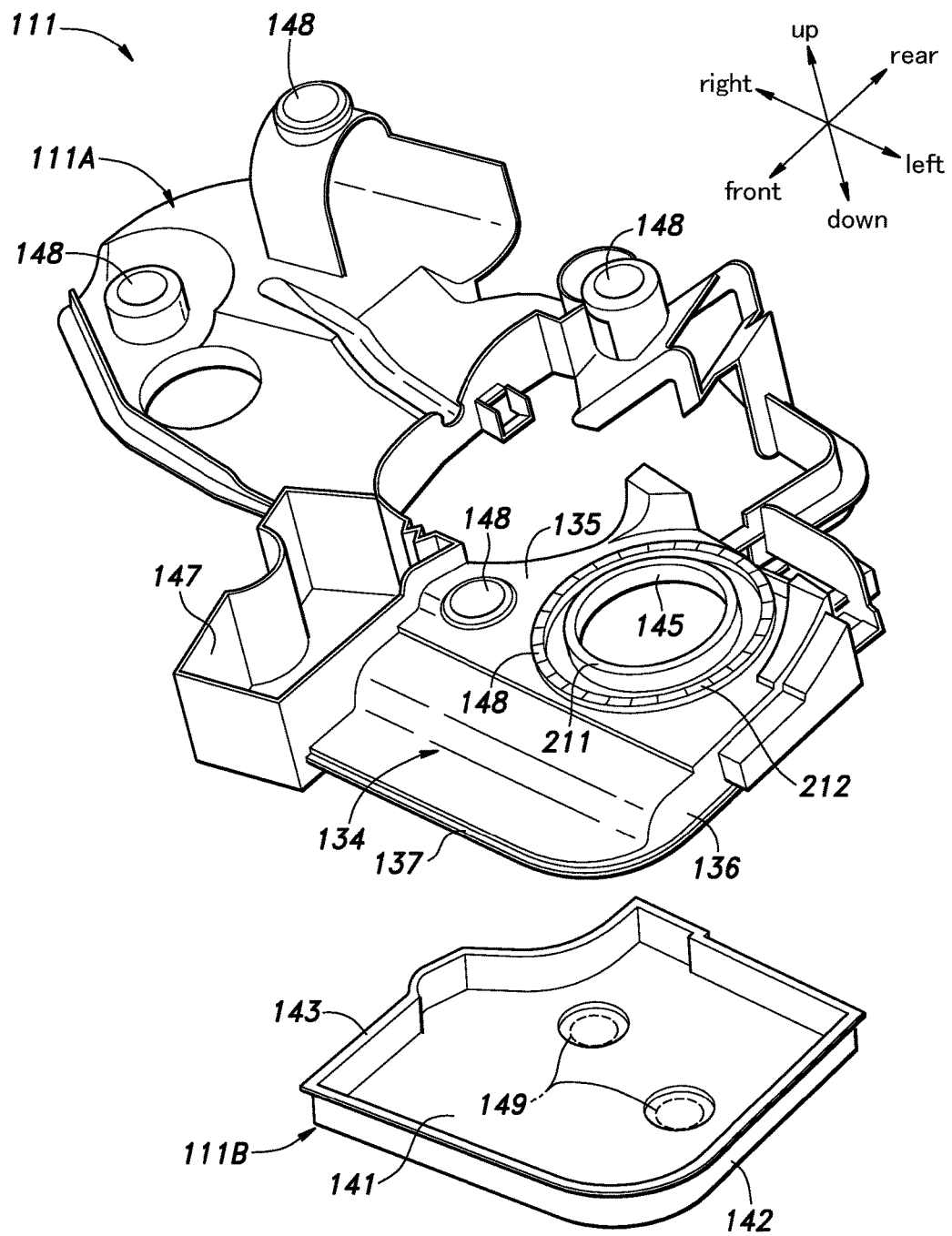
FIG. 7 is an exploded perspective view of a carrier and a high-octane fuel tank regarding the second embodiment.

The carrier 111 is a member serving as a main frame that supports the raw fuel tank 102 from inside to suppress deformation of the raw fuel tank 102. As shown in FIGS. 3, 7, and 8, the carrier 111 includes a first member 111A and a second member 111B joined to the first member 111A. In the second embodiment, the first member 111A and the second member 111B are each made of resin.

The first member 111A of the carrier 111 extends in the fore-and-aft direction and in the lateral direction inside the raw fuel tank 102. The first member 111A includes a tank forming member 134, which forms a recess that is recessed upward and opens downward. The tank forming member 134 includes an upper wall 135 and an upper side wall 136 protruding downward from the periphery of the upper wall 135. The protruding end (lower end) of the upper side wall 136 is provided with an upper flange 137 that protrudes outward. The protruding end surface (lower end surface) and the upper flange 137 of the upper side wall 136 form an upper engagement surface that faces downward.

The second member 111B includes a lower wall 141 and a lower side wall 142 protruding upward from the periphery of the lower wall 141, and is formed in a box shape opening upward (dish shape). The protruding end (upper end) of the lower side wall 142 is provided with a lower flange 143 that protrudes outward. The protruding end surface (lower end surface) and the lower flange 143 of the lower side wall 142 form a lower engagement surface that faces upward.

The tank forming member 134 and the second member 111B are formed in mutually corresponding shapes, and the upper engagement surface of the tank forming member 134 and the lower engagement surface of the second member 111B are engaged with each other such that a closed space is defined between the tank forming member 134 and the second member 111B. The high-octane fuel tank 113 is formed by the tank forming member 134 and the second member 111B. Namely, at least a part of the high-octane fuel tank 113 is formed by the carrier 111. In the second embodiment, the upper engagement surface of the tank forming member 134 and the lower engagement surface of the second member 111B extend substantially in a horizontal direction and are welded to each other.

The upper wall 135 of the tank forming member 134 is provided with a third opening 145 extending through a thickness thereof. The third opening 145 is located at a position opposing the inner end side of the second opening 105 so as to be substantially coaxial with the second opening 105.

Further, the first member 111A of the carrier 111 has a recess 147 opening upward, and the fuel circulation pump 125 is disposed in the recess 147. The recess 147 is located near the bottom wall 102B of the raw fuel tank 102, and is usually filled with raw fuel. When inertial force is applied to the raw fuel upon acceleration/deceleration or turning of the vehicle, the recess 147 suppresses movement of the raw fuel and retains the raw fuel around the fuel circulation pump 125, so that the fuel circulation pump 125 is kept below the liquid surface of the raw fuel. Further, the first member 111A has a plurality of vertically extending plate pieces that serve as barriers for suppressing the movement of the raw fuel due to inertial force.

The carrier 111 includes upper contact portions 148 contacting an inner surface (undersurface) of the upper wall 102A and lower contact portions 149 contacting an inner surface (upper surface) of the bottom wall 102B. There may be provided at least one upper contact portion 148 and at least one lower contact portion 149. The upper contact portions 148 are welded to the upper wall 102A, and the lower contact portions 149 are welded to the bottom wall 102B. In the second embodiment, the upper contact portions 148 are formed in the first member 111A, and the lower contact portions 149 are formed in the first member 111A and the second member 111B.

At least one of the upper contact portions 148 is formed on the upper surface of the upper wall 135 of the tank forming member 134, and at least one of the lower contact portions 149 is formed on the undersurface of the lower wall 141 of the second member 111B. Thereby, the tank forming member 134 and the second member 111B, which form the high-octane fuel tank 113, are sandwiched between the upper wall 102A and the bottom wall 102B of the raw fuel tank 102, and this suppresses separation of the upper engagement surface of the tank forming member 134 and the lower engagement surface of the second member 111B. Further, the carrier 111 suppresses deformation and relative movement of the upper wall 102A and the bottom wall 102B, whereby deformation of the raw fuel tank 102 is suppressed.

The carrier 111 is disposed so as to surround the separator unit 120 and the vacuum pump 126, and suppresses displacement of the separator unit 120 and the vacuum pump 126 relative to the raw fuel tank 102. Specifically, the carrier 111 is disposed to surround the lateral and upper sides of the separator unit 120 and the vacuum pump 126, such that the weight of the separator unit 120 and the vacuum pump 126 is applied mainly to the sub-frame 114 rather than to the carrier 111.

As shown in FIG. 3, the fuel circulation pump 125 pressurizes the raw fuel stored in the raw fuel tank 102 to feed the fuel under pressure to the separator 117. On the path of a conduit 161 connecting the fuel circulation pump 125 and the separator 117, the condenser 118, the first heat exchanger 121, and the third heat exchanger 123 are arranged in order from the side of the fuel circulation pump 125. The raw fuel supplied from the fuel circulation pump 125 undergoes heat exchange at the condenser 118, the first heat exchanger 121, and the third heat exchanger 123, such that the raw fuel having a temperature raised from that of the raw fuel stored at the bottom of the interior of the raw fuel tank 102 is supplied to the separator 117. Details of the condenser 118, the first heat exchanger 121, and the third heat exchanger 123 will be described later.

The separator 117 has a structure similar to that of the separator 6 of the first embodiment, and includes a separation membrane 117A that selectively passes the high octane number components in the raw fuel, and a first chamber 117B and a second chamber 117C partitioned by the separation membrane 117A.

The high-temperature and high-pressure raw fuel that has passed through the condenser 118, the first heat exchanger 121, and the third heat exchanger 123 owing to the fuel circulation pump 125 is supplied to the first chamber 117B of the separator 117. The pressure in the second chamber 117C is reduced by the vacuum pump 126, which will be described later. Thereby, the high octane number components in the raw fuel supplied to the first chamber 117B are vaporized and pass through the separation membrane 117A to be collected in the second chamber 117C. As a result, the fuel in the second chamber 117C makes high-octane fuel that contains a greater amount of components with high octane numbers than the raw fuel. On the other hand, as the raw fuel supplied to the first chamber 117B moves toward the exit of the first chamber 117B, a larger amount of components with high octane numbers is separated therefrom, whereby low-octane fuel that contains a greater amount of components with low octane numbers than the raw fuel is made. In a case where the raw fuel is ethanol-blended gasoline, the high-octane fuel collected in the second chamber 117C mainly contains ethanol, while the low-octane fuel passing through the first chamber 117B contains gasoline with a reduced amount (concentration) of ethanol.

The condenser 118 is preferably disposed adjacent to the second chamber 117C of the separator 117. In the second embodiment, as shown in FIGS. 8 to 10, the separator 117 is formed in a cylindrical shape having an axis extending in a horizontal direction, and the condenser 118 is formed in a flat box shape. The condenser 118 is joined to a lower portion of the separator 117, such that the separator 117 and the condenser 118 configure the single separator unit 120. The separator unit 120 is joined to the first arm portion 114B of the sub-frame 114 at the condenser 118.

As shown in FIG. 3, at the condenser 118, the gaseous high-octane fuel supplied from the second chamber 117C and the raw fuel supplied from the fuel circulation pump 125 exchange heat. As a result of this heat exchange, the gaseous high-octane fuel is cooled and condensed, and the raw fuel is heated.

The condenser 118 is connected to the high-octane fuel tank 113 by a conduit 162. The buffer tank 119 is provided on the path of the conduit 162. The condenser 118 is placed higher than the buffer tank 119 and the high-octane fuel tank 113, and the buffer tank 119 is placed higher than the high-octane fuel tank 113. Specifically, the positional relationship between the condenser 118, the buffer tank 119, and the high-octane fuel tank 113 is set such that the liquid surface in the condenser 118 is positioned higher than the liquid surface in the buffer tank 119 and the liquid surface in the high-octane fuel tank 113, and the liquid surface in the buffer tank 119 is positioned higher than the liquid surface in the high-octane fuel tank 113. Further, the separator 117 is preferably placed higher than the buffer tank 119 and the high-octane fuel tank 113. Due to the positional relationship between the condenser 118, the buffer tank 119, and the high-octane fuel tank 113, the high-octane fuel liquefied in the condenser 118 flows by gravity to the buffer tank 119, and further, from the buffer tank 119 to the high-octane fuel tank 113.

At a part of the conduit 162 connecting the condenser 118 and the buffer tank 119, a first one-way valve 164 that permits only the flow of fluid from the condenser 118 toward the buffer tank 119 is provided. Further at a part of the conduit 162 connecting the buffer tank 119 and the high-octane fuel tank 113, a second one-way valve 165 that permits only the flow of fluid from the buffer tank 119 toward the high-octane fuel tank 113 is provided.

The inlet of the vacuum pump 126 is connected to a gas phase portion in an upper part of the buffer tank 119 via a conduit 167. The outlet of the vacuum pump 126 is connected to a lower part of the high-octane fuel tank 113 via a conduit 168. When the vacuum pump 126 is operated, the gas in the upper part of the buffer tank 119 is transported to the high-octane fuel tank 113 via the conduits 167, 168, and the pressure in the buffer tank 119 is reduced. Due to the reduction in pressure in the buffer tank 119, the flow of fluid from the condenser 118 toward the buffer tank 119 is enhanced, the first one-way valve 164 is opened, and the pressure in the condenser 118 and the second chamber 117C of the separator 117, which are in communication with the buffer tank 119, is reduced. At this time, in response to the reduction in pressure in the buffer tank 119, the second one-way valve 165 is closed, and thus, the pressure in the high-octane fuel tank 113 is not reduced.

The conduit 167 connecting the vacuum pump 126 and the buffer tank 119 has a branch pipe 169 that branches off therefrom. An end of the branch pipe 169 is in communication with a gas phase portion in the raw fuel tank 102. In the second embodiment, the tank forming member 134 forming an upper half of the high-octane fuel tank 113 is provided with a communication pipe 170 that connects the gas phase portion in an upper part of the interior of the high-octane fuel tank 113 and the gas phase portion in an upper part of the raw fuel tank 102, and the branch pipe 169 is connected to the communication pipe 170 and is in communication with the gas phase portion in the raw fuel tank 102 via the communication pipe 170. The communication pipe 170 has one end placed near an inner surface of the upper wall 102A of the raw fuel tank 102, and the other end placed near an inner surface of the upper wall 135 of the high-octane fuel tank 113. As shown in FIGS. 8 and 9, an end of the communication pipe 170 on the side of the raw fuel tank 102 is placed at a vertically central part of the raw fuel tank 102 and near a later-described float valve 229.

As shown in FIG. 3, an on-off valve 172 consisting of a solenoid valve is provided on the path of the branch pipe 169. The on-off valve 172 is closed when the pressure in the buffer tank 119 is to be reduced. When the on-off valve 172 is opened, the gas in the raw fuel tank 102 flows into the buffer tank 119 via the communication pipe 170, the branch pipe 169, and the conduit 167, and the pressure in the buffer tank 119 becomes equal to the pressure in the raw fuel tank 102. When the liquid high-octane fuel in the buffer tank 119 is to be transported to the high-octane fuel tank 113, the operation of the vacuum pump 126 is stopped and the on-off valve 172 is opened, so that the reduction in pressure in the buffer tank 119 is cancelled. As a result, the high-octane fuel flows by gravity from the buffer tank 119 toward the high-octane fuel tank 113, and the second one-way valve 165 is opened.

The outlet of the first chamber 117B of the separator 117 is in communication with a lower part of the space in the raw fuel tank 102 via a conduit 174. On the path of the conduit 174, the first heat exchanger 121, the second heat exchanger 122, a strainer 175, and a pressure regulating valve 176 are provided in order from the side of the separator 117.

The first heat exchanger 121 causes heat exchange between the raw fuel supplied from the fuel circulation pump 125 to the separator 117 and having a relatively low temperature and the low-octane fuel that has passed through the separator 117 and has a relatively high temperature. The first heat exchanger 121 may be a known counter-flow heat exchanger. As a result of the heat exchange at the first heat exchanger 121, the raw fuel supplied from the fuel circulation pump 125 to the separator 117 is heated, and the low-octane fuel having passed through the separator 117 is cooled.

The second heat exchanger 122 has an internal space through which the low-octane fuel having passed through the separator 117 and having a relatively high temperature passes, and an outer surface in contact with an inner surface of a wall portion of the raw fuel tank 102, whereby heat is exchanged between the low-octane fuel and the wall portion of the raw fuel tank 102. In the second embodiment, the second heat exchanger 122 is formed to have a flat sheet-like shape and is disposed to be in contact with an inner surface of the bottom wall 102B of the raw fuel tank 102. In the second embodiment, the first heat exchanger 121 and the second heat exchanger 122 are joined to each other to form a single unit.

An outer surface of the bottom wall 102B of the raw fuel tank 102 is provided with a plurality of fins 181 and a fan 182. The bottom wall 102B of the raw fuel tank 102 is cooled by the wind caused by traveling of the automobile on which the fuel supply device 101 is mounted and the air supplied by the fan 182.

The low-octane fuel that has passed through the second heat exchanger 122 passes through the strainer 175 to remove foreign matter, then passes through the pressure regulating valve 176, and is discharged to the bottom of the interior of the raw fuel tank 102 to be mixed with the raw fuel. By the mixture of the low-octane fuel with the raw fuel, the octane number of the fuel in the raw fuel tank 102 is reduced. As the cycle of separation progresses (the total amount of the raw fuel passing through the separator 117 increases), the octane number of the fuel in the raw fuel tank 102 decreases and the components thereof approach those of the low-octane fuel. The pressure regulating valve 176 regulates the pressure of the raw fuel and the low-octane fuel in the path from the fuel circulation pump 125 to the pressure regulating valve 176, and maintains the pressure of the raw fuel in the first chamber 117B of the separator 117 at a predetermined pressure. Specifically, the pressure regulating valve 176 discharges the raw fuel (low-octane fuel) into the raw fuel tank 102 when the pressure of the raw fuel (low-octane fuel) raised by the fuel circulation pump 125 becomes the predetermined pressure or greater, to thereby maintain the pressure at the predetermined pressure.

The third heat exchanger 123 is a device for causing heat exchange between the raw fuel fed from the fuel circulation pump 125 to the separator 117 and a high temperature heat medium supplied from outside of the raw fuel tank 102, and is used as a heater for heating the raw fuel. The high temperature heat medium supplied to the third heat exchanger 123 may be, for example, cooling water whose temperature is raised as the cooling water passes through the internal combustion engine 184, lubricating oil whose temperature is raised as the lubricating oil passes through the internal combustion engine 184 and/or the transmission, automatic transmission fluid whose temperature is raised by heat exchange with the exhaust gas of the internal combustion engine 184, exhaust gas, etc. The high temperature heat medium in the second embodiment is the cooling water of the internal combustion engine 184, and a medium transport pipe 234 in communication with a cooling water passage 185 of the internal combustion engine 184 is connected with the third heat exchanger 123.

As shown in FIG. 3, a cylindrical first boss 191 protruding upward from the upper wall 102A is formed around the first opening 104. In other words, the first opening 104 is formed as an inner bore of the first boss 191. An outer circumferential surface of the first boss 191 is provided with a male thread (not shown in the drawings). The first lid 107 is formed in a circular shape, and can be brought into contact with a protruding end surface of the first boss 191 via a seal member (not shown in the drawings). The first lid 107 is joined to the first boss 191 by means of a first cap 192 threadably engaged with the first boss 191. The first cap 192 includes a cylindrical portion capable of receiving the first boss 191, a female thread formed in an inner surface of the cylindrical portion to be threadably engaged with the male thread of the first boss 191, and a flange projecting radially inward from one end of the cylindrical portion. Upon threadable engagement of the first cap 192 with the first boss 191, the first lid 107 is pushed toward the first boss 191 by the flange of the first cap 192 and comes into close contact with the protruding end surface of the first boss 191 via the seal member to close the first opening 104.

Figure 11:
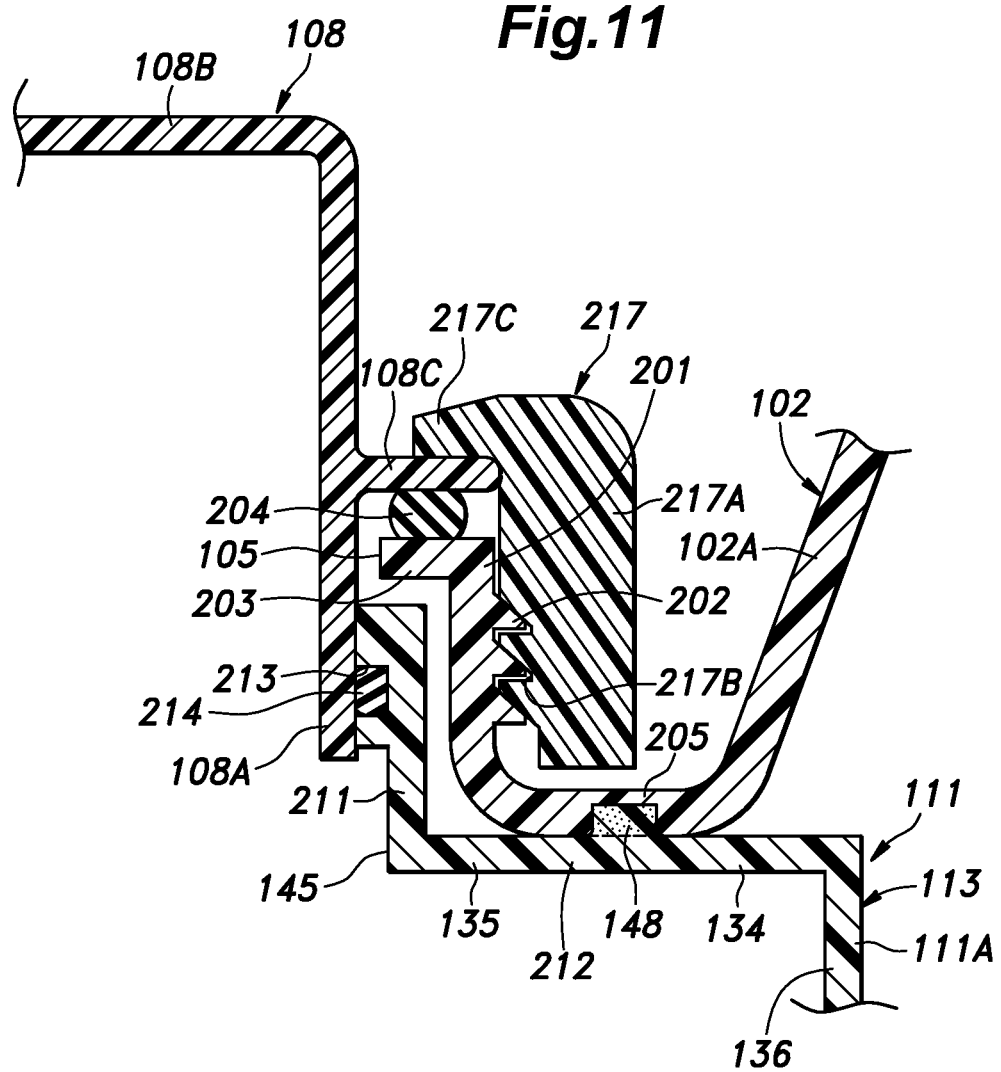
FIG. 11 is a transverse cross-sectional view showing the structure in the vicinity of a second opening and a third opening relating to the second embodiment.

As shown in FIGS. 3 and 11, a cylindrical second boss 201 protruding upward from the upper wall 102A is formed around the second opening 105. In other words, the second opening 105 is formed as an inner bore of the second boss 201. An outer circumferential surface of the second boss 201 is provided with a male thread 202. A protruding end of the second boss 201 is provided with an inward flange 203 that projects radially inward to exhibit an annular shape. The inward flange 203 extends the protruding end surface of the second boss 201. An upper end surface of the inward flange 203 is in a plane perpendicular to an axis of the second opening 105 (the second boss 201). On the upper end surface of the inward flange 203 is disposed an annular first seal member 204 extending to surround the second opening 105. The first seal member 204 is flexible and can be bought into close contact with a surface of an object to be sealed. A part of the upper wall 102A around the second boss 201 makes a first annular portion 205 shaped in a flat plate perpendicular to the second boss 201.

The third opening 145 is located to be substantially coaxial with the second opening 105 and inside the raw fuel tank 102. A cylindrical third boss 211 protruding upward from the upper wall 135 of the high-octane fuel tank 113 is formed around the third opening 145. In other words, the third opening 145 is formed as an inner bore of the third boss 211. A part of the upper wall 135 surrounding the third boss 211 makes a second annular portion 212 shaped in a flat plate perpendicular to the third boss 211. An upper surface of the second annular portion 212 is in contact with an undersurface of the first annular portion 205. Further, a part of the upper surface of the second annular portion 212 serves as an upper contact portion 148 and is welded to the undersurface of the first annular portion 205. The upper contact portion 148 in the second annular portion 212 is formed annularly to surround the third boss 211.

The third boss 211 extends upward inside the second boss 201. The protruding end (upper end) of the third boss 211 is placed at a position remote downward from the inward flange 203 of the second boss 201. Namely, the protruding end of the third boss 211 is placed inside the raw fuel tank 102. The third boss 211 is formed to have an outer diameter smaller than an inner diameter of the second boss 201, such that a gap is created between the outer circumferential surface of the third boss 211 and the inner circumferential surface of the second boss 201. Thereby, dimension errors and assembly errors of the raw fuel tank 102 and the high-octane fuel tank 113 (the carrier 111) can be tolerated. The inner circumferential surface of the third boss 211 is provided with an engagement groove 213 extending in the circumferential direction. The engagement groove 213 has an annular second seal member 214 fitted therein. The second seal member 214 is flexible and can be brought into close contact with a surface of an object to be sealed.

The second lid 108 includes a cylindrical portion 108A, an end wall portion 108B closing one end of the cylindrical portion 108A, and an outward flange 108C projecting radially outward from an outer circumferential surface of the cylindrical portion 108A and extending circumferentially to be in an annular shape. The cylindrical portion 108A of the second lid 108 is inserted in the second opening 105 and the third opening 145 such that the end wall portion 108B is positioned at an upper end. the outer circumferential surface of the cylindrical portion 108A opposes the inner circumferential surface of the third boss 211. The second seal member 214 is compressed between the cylindrical portion 108A and the third boss 211 in the radial direction of the third opening 145 (the third boss 211), and seals the gap between the cylindrical portion 108A and the third boss 211. Thereby, the third opening 145 is closed by the second lid 108, and the high-octane fuel tank 113 is closed.

In the state where the cylindrical portion 108A is inserted in the third boss 211, the outward flange 108C opposes the inward flange 203 of the second boss 201 via the first seal member 204. The second lid 108 is joined to the second boss 201 by means of a second cap 217 threadably engaged with the second boss 201. The second cap 217 includes a cylindrical portion 217A capable of receiving the second boss 201, a female thread 217B formed in an inner surface of the cylindrical portion 217A to be threadably engaged with the male thread 202 of the second boss 201, and a cap-side flange 217C projecting radially inward from one end of the cylindrical portion 217A.

By threadable engagement of the female thread 217B of the second cap 217 with the male thread 202 of the second boss 201, the second cap 217 is joined to the second boss 201. As the second cap 217 threadably advances relative to the second boss 201, the outward flange 108C is pushed by the cap-side flange 217C toward the first boss 191. As a result, the first seal member 204 is compressed between the outward flange 108C and the inward flange 203 in the axial direction of the second opening 105 (the second boss 201), and seals the gap between the outward flange 108C and the inward flange 203. Thereby, the second opening 105 is closed by the second lid 108, and the raw fuel tank 102 is closed.

As shown in FIG. 3, passing through the first lid 107 are: a first fuel line 222 that connects the raw fuel pump 128 and a first injector 221 of the internal combustion engine 184; a first cable bundle (not shown in the drawings) including a signal line and a power supply line for the raw fuel pump 128; a breather pipe 224 that connects the gas phase portion in the upper part of the raw fuel tank 102 and an upstream end of the fill tube 109; and a vapor tube 226 that connects the gas phase portion in the upper part of the raw fuel tank 102 and a canister 225. The parts where the first fuel line 222, the first cable bundle, the breather pipe 224, and the vapor tube 226 pass through the first lid 107 are sealed air-tightly.

The breather pipe 224 releases the gas in the raw fuel tank 102 to the fill tube 109 when the raw fuel is supplied through the fill tube 109 to thereby facilitate the flow of the raw fuel into the raw fuel tank 102. The vapor tube 226 releases the fuel vapor in the raw fuel tank 102 to the canister 225 to maintain the pressure in the raw fuel tank 102 at atmospheric pressure. The fuel vapor sent to the canister 225 is absorbed by activated carbon in the canister 225. During operation of the internal combustion engine 184, the fuel absorbed by the canister 225 is drawn in an intake passage 228 by a negative pressure therein, and is burned in the combustion chamber. An end portion of the vapor tube 226 located inside the raw fuel tank 102 is provided with a float valve 229. The float valve 229 is opened and closed in accordance with the liquid level of the raw fuel in the raw fuel tank 102 to prevent the liquid fuel from flowing in the vapor tube 226.

As shown in FIGS. 3, 8, and 9, the float valve 229 is disposed at an upper central portion of the raw fuel tank 102. The upper central portion of the raw fuel tank 102 is a portion placed at the highest in the raw fuel tank or a position, where the liquid surface of the raw fuel in the raw fuel tank 102 can reach the least easily. Further, when the raw fuel moves toward the side wall 102C in the front, rear, left, or right direction due to inertial force created by acceleration/deceleration, turning, or the like of the vehicle, the liquid surface of the raw fuel does not reach the upper central portion of the raw fuel tank 102 easily. As described above, the communication pipe 170 is disposed at the upper central portion of the raw fuel tank 102 near the float valve 229. Thereby, the liquid surface of the raw fuel is prevented from easily reaching an end of the communication pipe 170 on the side of the raw fuel tank 102, and intrusion of the liquid raw fuel into the communication pipe 170 is suppressed.

As shown in FIG. 3, passing through the second lid 108 are: a second fuel line 232 that connects the high-octane fuel pump 129 and a second injector 231 of the internal combustion engine 184; a second cable bundle (not shown in the drawings) including a signal line and a power supply line for the high-octane fuel pump 129; and the medium transport pipe 234 for circulating the high temperature heat medium to the third heat exchanger 123. The parts where the second fuel line 232, the second cable bundle, and the medium transport pipe 234 pass through the second lid 108 are sealed air-tightly. The medium transport pipe 234 is connected to the cooling water passage 185 including the water jacket of the internal combustion engine 184, and water having a relatively high temperature flows therethrough. At a part of the second fuel line 232 on the side of the second injector 231 with respect to the second lid 108 is disposed a strainer 235 for catching foreign matter in the fuel.

The fuel circulation pump 125, the separator 117, the first one-way valve 164, the buffer tank 119, the vacuum pump 126, the on-off valve 172, the second one-way valve 165, the first heat exchanger 121, the second heat exchanger 122, the strainer 175, the pressure regulating valve 176, the raw fuel pump 128, the float valve 229, and the sub-frame 114, which are disposed inside the raw fuel tank 102, are mounted to the carrier 111, which integrally includes the high-octane fuel tank 113, to configure an assembly. The sub-frame 114 is joined to the carrier 111 via the separator 117 and the vacuum pump 126. The relative position of the carrier 111 with respect to the raw fuel tank 102 is determined by engagement of the carrier 111 with an inner surface of the raw fuel tank 102. The relative position of each device configuring the assembly with respect to the raw fuel tank 102 is determined by the mounting of the device to the carrier 111.

An example of a method for manufacturing the above-described fuel supply device 101 will be described hereinafter. First, the first member 111A and the second member 111B configuring the carrier 111 are joined to each other to form the carrier 111 and the high-octane fuel tank 113 by means of vibration welding or the like. Then, the third heat exchanger 123 and the high-octane fuel pump 129 are disposed inside the high-octane fuel tank 113 through the third opening 145. It is to be noted that the first member 111A and the second member 111B may be joined to each other after the third heat exchanger 123 and the high-octane fuel pump 129 are interposed between the first member 111A and the second member 111B.

Next, devices are mounted on the carrier 111 including the high-octane fuel tank 113 to form the assembly. At this time, the conduits and wirings associated with the devices configuring the assembly are also connected as appropriate. Then, two parisons are placed to interpose the assembly therebetween and are put in a die, and blow-molding is carried out to mold the raw fuel tank 102. Thereby, the raw fuel tank 102 having the assembly provided therein is formed. At this time, the upper contact portions 148 and the lower contact portions 149 of the carrier 111 as well as the coupling member 131 are welded to the raw fuel tank 102. The upper contact portions 148, the lower contact portions 149, and the coupling member 131 have minute irregularities on the parts contacting the raw fuel tank 102. The irregularities of the upper contact portions 148, the lower contact portions 149, and the coupling member 131 bite into the parisons forming the raw fuel tank 102, and melt by the heat of the parison to be integral with the parisons. Thereby, when the parisons solidify, the upper contact portions 148, the lower contact portions 149, and the coupling member 131 are integrally joined to the raw fuel tank 102.

Subsequently, the first fuel line 222, the first cable bundle, the breather pipe 224, and the vapor tube 226 are arranged to pass through the first lid 107, and an air-tight seal is provided to each of the parts where these components pass through the first lid 107. Further, the second fuel line 232, the second cable bundle, and the medium transport pipe 234 are arranged to pass through the second lid 108, and an air-tight seal is provided to each of the parts where these components pass through the second lid 108. Then, the first lid 107 is attached to the first opening 104 and secured by the first cap 192, and the second lid 108 is attached to the second opening 105 and the third opening 145 and secured by the second cap 217. Thereby, the fuel supply device 101 is configured.

Description will now be made of the operations and effects of the fuel supply device 101 configured as above. In the fuel supply device 101, the raw fuel in the raw fuel tank 102 is pressurized by the fuel circulation pump 125, passes through the condenser 118, the first heat exchanger 121, and the third heat exchanger 123 in order, and is sent to the first chamber 117B of the separator 117. At this time, the raw fuel exchanges heat with the high-temperature, gaseous high-octane fuel at the condenser 118, with the high-temperature low-octane fuel that has passed through the separator 117 at the first heat exchanger 121, and with the high temperature heat medium at the third heat exchanger 123, whereby the temperature of the raw fuel is raised.

The pressure in the second chamber 117C of the separator 117 is reduced by an operation of the vacuum pump 126, with the on-off valve 172 closed. In the separator 117, when the pressure in the second chamber 117C is reduced by the suction action of the vacuum pump 126, high-octane fuel vaporizes from the high-temperature and high-pressure raw fuel supplied to the first chamber 117B, passes through the separation membrane 117A, and is collected in the second chamber 117C. The gaseous high-octane fuel collected in the second chamber 117C flows to the condenser 118, and at the condenser 118, exchanges heat with the raw fuel sent to the separator 117 by the fuel circulation pump 125 and thereby is cooled and condensed. The high-octane fuel condensed at the condenser 118 flows by gravity to the buffer tank 119 and is stored therein.

While the on-off valve 172 is closed and the vacuum pump 126 is operating, the second one-way valve 165 is closed, and therefore, the liquid high-octane fuel stored in the buffer tank 119 cannot flow to the high-octane fuel tank 113. At a predetermined timing, the on-off valve 172 is opened and the vacuum pump 126 is stopped, and this brings the interior of the buffer tank 119 and the interior of the raw fuel tank 102 into communication with each other, whereby the pressure in the buffer tank 119 becomes atmospheric pressure. When the pressure in the buffer tank 119 becomes atmospheric pressure, the high-octane fuel in the buffer tank 119 opens the second one-way valve 165 and flows into the high-octane fuel tank 113 by gravity. In this way, the high-octane fuel is stored in the high-octane fuel tank 113. In the case where the raw fuel is ethanol-blended gasoline, it can be said that the high-octane fuel tank 113 is an ethanol tank that mainly stores ethanol.

The low-octane fuel that has passed through the first chamber 117B of the separator 117 is cooled at the first heat exchanger 121 by exchanging heat with the raw fuel sent to the separator 117 by the fuel circulation pump 125, and is further cooled at the second heat exchanger 122 by exchanging heat with the bottom wall 102B of the raw fuel tank 102. Thereafter, the low-octane fuel passes through the strainer 175 and the pressure regulating valve 176, and is discharged into the raw fuel tank 102 to be mixed with the raw fuel in the raw fuel tank 102.

In the fuel supply device 101, as the total amount of the raw fuel passing through the separator 117 increases, the amount of the high-octane fuel stored in the high-octane fuel tank 113 increases and the ratio of the low-octane fuel contained in the raw fuel increases. The amount of the raw fuel passing through the separator 117 can be controlled by controlling the fuel circulation pump 125, the vacuum pump 126, and the on-off valve 172. It is preferred that the fuel circulation pump 125, the vacuum pump 126, and the on-off valve 172 be controlled based on the liquid level in the high-octane fuel tank 113, the concentration of the high-octane fuel in the raw fuel, the operating duration of the fuel circulation pump 125, etc.

In the fuel supply device 101 of the second embodiment, because the separation device 112 and the high-octane fuel tank 113 are disposed inside the raw fuel tank 102, by configuring the raw fuel tank 102 air-tight, it is unnecessary to make the separation device 112, the high-octane fuel tank 113, and the fittings connecting them be configured air-tight, and thus, the number of the members to be configured air-tight can be reduced.

Further, because the carrier 111 serving as a skeleton member of the raw fuel tank 102 forms the high-octane fuel tank 113, the volume of the components placed inside the raw fuel tank 102 is reduced and the raw fuel tank 102 is allowed to be downsized. In addition, because the high-octane fuel tank 113 is formed integrally with the carrier 111, the high-octane fuel tank 113 is secured to the raw fuel tank 102 via the carrier 111 so that the position thereof relative to the raw fuel tank 102 is determined.

Since the carrier 111 includes the first member 111A and the second member 111B joined to each other, it is easy to form the high-octane fuel tank 113 having an internal space. The first member 111A and the second member 111B that are joined to each other are each formed in a concave shape, and thus, the high-octane fuel tank 113 can have a relatively large volume.

Further, the first member 111A contacts the upper wall 102A of the raw fuel tank 102 while the second member 111B contacts the bottom wall 102B, whereby the raw fuel tank 102 is supported from inside and deformation thereof is suppressed. On the other hand, the first member 111A and the second member 111B are sandwiched between the upper wall 102A and the bottom wall 102B of the raw fuel tank 102, and thus, their positions are stable and separation of the engagement surfaces is suppressed. Further, because the contacting portions of the first member 111A and the upper wall 102A are welded to each other and the contacting portions of the second member 111B and the bottom wall 102B are welded to each other, the relative positions of the raw fuel tank 102, the first member 111A, and the second member 111B can be maintained even more stably.

The second opening 105 and the third opening 145 are opened and closed by the second lid 108 which is a member common to them, and thus, an operation for opening and closing the high-octane fuel tank 113 can be performed easily. In the second embodiment, the direction in which the first seal member 204 for sealing between the second lid 108 and the second boss 201 is compressed is different from the direction in which the second seal member 214 for sealing between the second lid 108 and the third boss 211 is compressed. Therefore, even when an error is caused in the relative positions of the second opening 105 and the third opening 145, the first seal member 204 can provide a reliable seal between the second lid 108 and the second boss 201, and the second seal member 214 can provide a reliable seal between the second lid 108 and the third boss 211.

Further, in the second embodiment, the separator unit 120 (the separator 117 and the condenser 118) and the vacuum pump 126, which have a relatively large weight, are supported by the sub-frame 114 in the separation device 112, and the base portion 114A of the sub-frame 114 is disposed at a part overlapping the tank support member 301 as seen in plan view. Thus, the load of the separator unit 120 and the vacuum pump 126 is supported by the tank support member 301, and deformation of the raw fuel tank 102 is suppressed. Particularly, the center of gravity of the assembly consisting of the separator unit 120, the vacuum pump 126, and the sub-frame 114 is disposed at a part overlapping the tank support member 301 as seen in plan view, and thus, the load of these components is supported by the tank support member 301 without fail.

As the sub-frame 114 preferably has a high rigidity, it is made of metallic material. The base portion 114A of the sub-frame 114 made of metallic material is fitted with the coupling member 131 made of resin material, and therefore, by welding the coupling member 131 and the bottom wall 102B of the raw fuel tank 102 to each other, the sub-frame 114 can be secured to the raw fuel tank 102.

A concrete embodiment has been described in the foregoing, but the present invention is not limited to the second embodiment, and can be carried out with various modifications. For example, the tank support member 301 supporting the raw fuel tank 102 from below is not limited to the belt-shaped member, and a frame member may be used. As the tank support member 301, a member having a cross section that is polygonal, circular, groove-like or H-shaped, for example, may be used. Further, the tank support member 301 may not extend in the fore-and-aft direction but may extend in any direction such as in the lateral direction.

Also, the second member 111B may be made of metal. In this case, the upper engagement surface of the tank forming member 134 and the lower engagement surface of the second member 111B are preferably fastened to each other via a packing or the like.

Further, in the second embodiment, the first member 111A of the carrier 111 forms an upper half of the high-octane fuel tank 113 and the second member 111B forms a lower half of the high-octane fuel tank 113, but an arrangement may be made such that the first member 111A forms a lower half of the high-octane fuel tank 113 and the second member 111B forms an upper half of the high-octane fuel tank 113. In this case, preferably, the first member 111A is formed in a concave shape that is recessed downward and opens upward, and the second member 111B is formed in a concave shape that is recessed upward and opens downward.

Further, the structure of the second opening 105, the third opening 145, and the second lid 108 may be replaced with any of first to third modifications shown in FIGS. 12(A) to 12(C), respectively. As shown in FIG. 12(A), in the first modification, the inner circumferential surface of the cylindrical portion 108A of the second lid 108 opposes the outer circumferential surface of the third boss 211. The second seal member 214 is supported in an annular engagement groove 241 formed in the outer circumferential surface of the cylindrical portion 108A. The annular second seal member 214 is disposed between the inner circumferential surface of the cylindrical portion 108A and the outer circumferential surface of the third boss 211, and is compressed along the radial direction of the third opening 145.

As shown in FIG. 12(B), in the second modification, the cylindrical portion 108A of the second lid 108 is provided on its end side with an enlarged diameter portion 108D where the outer diameter is enlarged. The outer circumferential surface of the enlarged diameter portion 108D opposes the inner circumferential surface of the second boss 201. The annular first seal member 204 is supported in an annular engagement groove 242 formed in the outer circumferential surface of the enlarged diameter portion 108D. The first seal member 204 is disposed between the outer circumferential surface of the enlarged diameter portion 108D and the inner circumferential surface of the second boss 201, and is compressed along the radial direction of the second opening 105. Further, the end surface of the cylindrical portion 108A of the second lid 108 opposes the end surface of the third boss 211. The annular second seal member 214 is disposed between the end surface of the cylindrical portion 108A and the end surface of the third boss 211, and is compressed along the axial direction of the third opening 145.

As shown in FIG. 12(C), in the third modification, a second cylindrical portion 108E concentric with the cylindrical portion 108A is provided to the end of the outward flange 108C of the second lid 108. The second boss 201 is provided at its end portion with a reduced diameter portion 243 where the outer diameter is reduced. The inner circumferential surface of the second cylindrical portion 108E opposes the outer circumferential surface of the reduced diameter portion 243 the second boss 201. The annular first seal member 204 is supported in an annular engagement groove 244 formed in the outer circumferential surface of the reduced diameter portion 243. The first seal member 204 is disposed between the outer circumferential surface of the reduced diameter portion 243 and the inner circumferential surface of the second cylindrical portion 108E, and is compressed along the radial direction of the second opening 105. Further, the end surface of the cylindrical portion 108A of the second lid 108 opposes the end surface of the third boss 211. The annular second seal member 214 is disposed between the end surface of the cylindrical portion 108A and the end surface of the third boss 211, and is compressed along the axial direction of the third opening 145.

GLOSSARY

1 . . . fuel supply device, 2 . . . raw fuel tank, 2A . . . upper wall portion, 2D . . . bottom wall portion, 5 . . . high-octane fuel tank, 5A . . . upper wall portion, 5B . . . communication pipe, 5C . . . passage wall portion, 5D . . . upper end opening (high-octane fuel tank opening), 6 . . . separator, 6A . . . separation membrane, 6B . . . first chamber, 6C . . . second chamber, 7 . . . condenser, 8 . . . buffer tank, 9 . . . first heat exchanger, 10 . . . second heat exchanger, 11 . . . fuel circulation pump, 12 . . . vacuum pump, 13 . . . raw fuel pump, 14 . . . first carrier, 16 . . . high-octane fuel pump, 17 . . . third heat exchanger, 18 . . . second carrier, 33 . . . on-off valve, 37 . . . pressure regulating valve, 41 . . . fin, 42 . . . fan, 45 . . . internal combustion engine, 46 . . . cooling water passage, 47 . . . medium transport pipe (high temperature medium transport pipe), 50 . . . first opening, 51 . . . second opening (raw fuel tank opening), 52 . . . first lid, 53 . . . second lid, 56 . . . first fuel line, 57 . . . first cable bundle, 58 . . . breather pipe, 60 . . . vapor tube, 64 . . . second injector, 65 . . . second fuel line (high-octane fuel supply pipe), 66 . . . second cable bundle, 101 . . . fuel supply device, 102 . . . raw fuel tank (first fuel tank), 104 . . . first opening, 105 . . . second opening, 107 . . . first lid, 108 . . . second lid, 111 . . . carrier (skeleton member), 111A . . . first member, 111B . . . second member, 112 . . . separation device, 113 . . . high-octane fuel tank (second fuel tank), 114 . . . sub-frame (separation device support member), 114A . . . base portion, 114B . . . first arm portion, 114C . . . second arm portion, 117 . . . separator, 118 . . . condenser, 119 . . . buffer tank, 120 . . . separator unit, 121 . . . first heat exchanger, 122 . . . second heat exchanger, 123 . . . third heat exchanger, 125 . . . fuel circulation pump, 126 . . . vacuum pump (negative pressure pump), 128 . . . raw fuel pump, 129 . . . high-octane fuel pump, 131 . . . coupling member, 134 . . . tank upper half, 145 . . . third opening, 148 . . . upper contact portion, 149 . . . lower contact portion, 170 . . . communication pipe, 201 . . . second boss, 202 . . . male thread, 203 . . . inward flange, 204 . . . first seal member, 211 . . . third boss, 214 . . . second seal member, 217 . . . second cap 217A . . . cylindrical portion, 217B . . . female thread, 217C . . . cap-side flange, 229 . . . float valve, 300 . . . underbody, 301 . . . tank support member

The invention claimed is:

1. A fuel supply device, comprising:
    a fuel tank for storing fuel, wherein the fuel comprises components with different octane numbers;
    a separator provided inside the fuel tank to separate the fuel into high-octane fuel that contains a greater amount of components with high octane numbers than the fuel and low-octane fuel that contains a greater amount of components with low octane numbers than the fuel; and
    a high-octane fuel tank provided inside the fuel tank to store the high-octane fuel separated from the fuel by the separator, wherein the separator has two chambers partitioned by a separation membrane, such that the high-octane fuel in a gas state included in the fuel supplied to one of the chambers is caused to pass through the separation membrane by pervaporation to be collected in the other of the chambers,
    the fuel supply device further comprising a condenser provided inside the fuel tank to condense the high-octane fuel in the gas state separated by the separator.

2. The fuel supply device according to claim 1, wherein the condenser is placed higher than the high-octane fuel tank.

3. The fuel supply device according to claim 1, further comprising a heater provided inside the fuel tank to heat the fuel supplied from the fuel tank to the separator,
    wherein the condenser causes the fuel to exchange heat with the high-octane fuel before the fuel passes through the heater.

4. A fuel supply device, comprising:
    a fuel tank for storing fuel, wherein the fuel comprises components with different octane numbers;
    a separator provided inside the fuel tank to separate the fuel into high-octane fuel that contains a greater amount of components with high octane numbers than the fuel and low-octane fuel that contains a greater amount of components with low octane numbers than the fuel;
    a high-octane fuel tank provided inside the fuel tank to store the high-octane fuel separated from the fuel by the separator; and
    a heat exchanger provided along an inner surface of a wall portion of the fuel tank to cause the low-octane fuel to exchange heat with the wall portion after the low-octane fuel has passed through the separator.

5. The fuel supply device according to claim 4, wherein the wall portion where the heat exchanger is provided is a bottom wall portion of the fuel tank.

6. The fuel supply device according to claim 4, wherein an outer surface of the wall portion is provided with fins.

7. A fuel supply device, comprising:
    a fuel tank for storing fuel, wherein the fuel comprises components with different octane numbers;
    a separator provided inside the fuel tank to separate the fuel into high-octane fuel that contains a greater amount of components with high octane numbers than the fuel and low-octane fuel that contains a greater amount of components with low octane numbers than the fuel; and
    a high-octane fuel tank provided inside the fuel tank to store the high-octane fuel separated from the fuel by the separator, wherein:
    the fuel tank has a fuel tank opening extending through an upper wall portion of the fuel tank and a lid that openably closes the fuel tank opening;
    the high-octane fuel tank has a high-octane fuel tank opening extending through an upper wall portion of the high-octane fuel tank; and
    the high-octane fuel tank opening is located to align with the fuel tank opening and is openably closed by the lid.

8. The fuel supply device according to claim 7, further comprising a high-octane fuel supply pipe extending from inside the high-octane fuel tank to outside through the lid to supply the high-octane fuel in the high-octane fuel tank to outside.

9. The fuel supply device according to claim 8, further comprising:
    a high-octane fuel pump disposed inside the high-octane fuel tank to feed the high-octane fuel under pressure to outside via the high-octane fuel supply pipe; and
    a cable including a signal line and a power supply line for the high-octane fuel pump and extending from inside the high-octane fuel tank to outside through the lid.

10. The fuel supply device according to claim 7, further comprising a high temperature medium transport pipe that extends from outside to an interior of the high-octane fuel tank or an interior of the fuel tank through the lid to circulate a high temperature medium for heating the fuel supplied from the fuel tank to the separator.

11. A fuel supply device, comprising:
a fuel tank for storing fuel, wherein the fuel comprises components with different octane numbers;
a separator provided inside the fuel tank to separate the fuel into high-octane fuel that contains a greater amount of components with high octane numbers than the fuel and low-octane fuel that contains a greater amount of components with low octane numbers than the fuel; and
a high-octane fuel tank provided inside the fuel tank to store the high-octane fuel separated from the fuel by the separator, wherein the high-octane fuel tank has a communication passage that connects a gas phase portion in an upper part of the high-octane fuel tank and a gas phase portion in an upper part of the fuel tank.

* * * * *